United States Patent
Gilhousen

[19]

[11] Patent Number: 6,034,635
[45] Date of Patent: Mar. 7, 2000

[54] METHOD FOR USING ONLY TWO BASE STATIONS FOR DETERMINING THE POSITION OF A MOBILE SUBSCRIBER IN A CDMA CELLULAR TELEPHONE SYSTEM

[76] Inventor: Klein S. Gilhousen, 6474 Jackson Creek Rd., Bozeman, Mont. 59715

[21] Appl. No.: 08/659,409

[22] Filed: Jun. 6, 1996

[51] Int. Cl.⁷ .................................................. G01S 3/02
[52] U.S. Cl. ............................................................ 342/457
[58] Field of Search .................................. 342/450, 457; 455/54.1, 56.1, 67.6, 33.1

[56] References Cited

U.S. PATENT DOCUMENTS

| | | | |
|---|---|---|---|
| 3,093,828 | 6/1963 | Stutz ........................................ | 343/118 |
| 3,150,372 | 9/1964 | Groth, Jr. ................................ | 343/112 |
| 3,680,121 | 7/1972 | Anderson et al. ..................... | 343/112 |
| 3,687,556 | 8/1972 | Price et al. .............................. | 356/152 |
| 3,714,657 | 1/1973 | Lapeyre .................................. | 343/106 |
| 3,848,254 | 11/1974 | Drebinger et al. .................. | 343/112 R |
| 4,053,892 | 10/1977 | Earp ........................................ | 343/106 |
| 4,109,249 | 8/1978 | Barton .................................... | 343/108 |
| 4,232,317 | 11/1980 | Freeny et al. .......................... | 343/112 |
| 4,438,439 | 3/1984 | Shreve .................................... | 343/449 |
| 4,799,062 | 1/1989 | Sanderford et al. .................... | 342/450 |
| 4,897,661 | 1/1990 | Hiraiwa .................................. | 342/457 |
| 4,916,455 | 4/1990 | Bent et al. .............................. | 342/457 |
| 5,045,861 | 9/1991 | Duffett-Smith ........................ | 342/457 |
| 5,046,130 | 9/1991 | Hall et al. ............................... | 455/78 |
| 5,218,618 | 6/1993 | Sagey ........................................ | 375/1 |
| 5,267,262 | 11/1993 | Wheatley, III ........................ | 375/1 |
| 5,280,629 | 1/1994 | Lo Galbo et al. ..................... | 455/51.2 |
| 5,293,645 | 3/1994 | Sood ........................................ | 455/54.1 |
| 5,423,067 | 6/1995 | Manabe .................................. | 455/56.1 |
| 5,508,708 | 4/1996 | Ghosh et al. .......................... | 342/457 |
| 5,551,057 | 8/1996 | Mitra ...................................... | 455/33.1 |
| 5,568,152 | 10/1996 | Janky et al. ............................ | 342/357 |
| 5,600,706 | 2/1997 | Dunn et al. ............................ | 379/59 |
| 5,614,914 | 3/1997 | Bolgiano et al. ...................... | 342/364 |
| 5,732,354 | 3/1998 | MacDonald ............................ | 455/456 |
| 5,736,964 | 4/1998 | Ghosh et al. .......................... | 342/457 |
| 5,844,522 | 12/1998 | Sheffer et al. .......................... | 342/457 |

*Primary Examiner*—Thomas H. Tarcza
*Assistant Examiner*—Dao L. Phan
*Attorney, Agent, or Firm*—Russell B. Miller; Sean English; Bruce W. Greenhaus

[57] ABSTRACT

A method for determining the position of a mobile station within a cellular telephone system having first and second base stations. A round trip signal propagation time between the first base station and the mobile station is measured at the first base station. A first signal is transmitted from the first base station to the mobile station, and a second signal is transmitted from the second base station to the mobile station. An arrival time difference representing a time interval between a first relative time when the first signal is received at the mobile station and a second relative time when the second signal is received at the mobile station is measured at the mobile station. The position of the mobile station is determined in accordance with the round trip propagation time and the arrival time difference.

A method for determining the position of a mobile station within a cellular telephone system having first and second base stations. A first round trip signal propagation time between the first base station and the mobile station is measured at the first base station. A second round trip signal propagation time between the second base station and the mobile station is measured at the second base station. The position of the mobile station is determined in accordance with the first and second round trip propagation times.

14 Claims, 20 Drawing Sheets

METHOD FOR USING ONLY TWO BASE STATIONS FOR DETERMINING THE POSITION OF A MOBILE SUBSCRIBER IN A CDMA CELLULAR TELEPHONE SYSTEM

FIELD OF THE INVENTION

The present invention relates generally to cellular telephone systems. More specifically, the present invention relates to systems and methods for determining the geographical position of a mobile subscriber within a cellular telephone system. Still more particularly, the present invention relates to a method for locating a mobile subscriber within a code division multiple access (CDMA) cellular telephone system.

BACKGROUND OF THE INVENTION

There are several desirable reasons for having a service that can determine the position of a mobile radio operating within a cellular telephone system. For example, such a positioning service could be used for locating emergency callers (911) or children positioned within a cellular system. Alternatively, such a positioning service could be used for locating vehicles as part of a dispatching or fleet monitoring system. Also, cellular system operators could use such a positioning service in order to customize service parameters based on an accurate knowledge of mobile telephone location. Such customization could include, for example, providing lower cost services for limited mobility customers. A positioning service would also be of use in locating stolen cellular phones and for investigating fraudulent use of cellular services.

Methods for radio position determination make use of techniques for measuring the propagation delay of a radio signal, which is assumed to travel in a straight line from a transmitter to a receiver at the speed of light. A radio delay measurement in combination with an angle measurement provided by a directive antenna is the fundamental principle of radar location. Radar location is frequently augmented by use of a transponder in the mobile vehicle, rather than relying entirely on the signal reflected by the mobile vehicle.

Alternatively, a so-called trilateration system may be used for locating a mobile radio. In a trilateration system, multiple time delay measurements are made using multiple transmitters and/or receivers. The Loran system is an example of a location system which transmits a series of coded pulses from base stations at known and fixed locations to a mobile receiver. The mobile receiver compares the times of arrival of signals from the different transmitters to determine hyperbolic lines of positions. Similarly, the Global Positioning System (GPS) provides transmission from a set of 24 earth orbiting satellites. Mobile receivers can determine their position by using knowledge of the satellites' locations and the time delay differences between signals received from four or more satellites.

From the above examples, it can be seen that radio position location systems can be divided into two types, those which allow a mobile user to determine its own position, such as GPS, and those which allow another party to determine the position of a mobile transponder such as radar systems. The system disclosed in the present application includes elements of both types, but primarily of the second type, where the fixed portion of a radio system wishes to determine the location of a mobile radio unit positioned within the system. Except in the case of passive radar, such systems generally require the mobile radio unit to transmit a radio signal.

U.S. Pat. No. 5,126,748, entitled "Dual Satellite Navigation Method and System," discloses a method of radio location where the mobile terminal both transmits and receives signals, thereby allowing round trip timing measurements defining circular lines of position to be performed using fewer transmitter sites than required for the Loran and GPS systems in which the mobile terminals contain only receiving capability. In other systems, the mobile terminal may contain only a transmitter and the remaining system elements perform direction finding or multiple receptions of the signal from different locations to determine the position. An example of this is the SARSAT system for locating downed aircraft. In this system, the downed aircraft transmits a signal on the international distress frequency 121.5 MHz (and 273 MHz). An earth orbiting satellite relays the signal to an earth terminal. As the satellite passes overhead, the change in Doppler shift can be detected and a line of position can be determined. Multiple overhead passes by the same or similar satellites can determine a set of lines of position, the intersection of which determines the location of the downed aircraft.

It has long been known that direct sequence spread spectrum signals have useful properties for ranging and position location. Some of the earliest spread spectrum anti-jamming military communications systems also included an accurate ranging capability. GPS is, of course, based on the use of direct sequence spread spectrum waveforms. In GPS, a user's receiver determines its position in four dimensional space-time by making time difference measurements on the signals being received from four or more satellites in view. The satellites are positioned in inclined, 12 hour orbits and arranged so that most of the time in most places, enough satellites will be in view with adequate geometry to permit accurate position calculations. The GPS system informs navigation terminals of current satellite ephemeris information which is required for position calculations.

The Telecommunications Industry Association (TIA) in association with the Electronic Industry Association (EIA) has developed and published an Interim Standard entitled "Mobile Station-Base Station Compatability Standard for Dual-Mode Wideband Spread Spectrum Cellular System," and referred to as TIA/EIA/IS-95-A, May, 1995 (hereafter "the IS-95 standard.") The IS-95 standard supports a code division multiple access (CDMA) cellular system which synchronizes the transmissions of all cells in a cellular system using the GPS satellite downlink signals to update rubidium clocks. Thus, in the IS-95 CDMA system, timing is transferred from the GPS system directly to the cellular system.

The IS-95 CDMA system can determine the location of a mobile station in three dimensional space-time (time plus two dimensional positioning) provided that the mobile receiver is able to receive and track the pilot signals of three neighboring base stations and is provided with accurate location information of the base stations. Likewise, if three IS-95 base stations are able to make timing measurements of a mobile's signal, the system can determine the location of the mobile station. The IS-95 CDMA system implements the universal frequency reuse principal, wherein all sectors and all cells in the system normally operate on the same frequency. This universal frequency reuse principal is central to CDMA's achievement of high system capacity. However, the implementation of the universal frequency reuse prinicpal in a CDMA system can make locating a mobile station problematic in those instances where a mobile station comes close to a base station. In such instances, it may become difficult to achieve an adequate SNR when trying to receive the neighboring base stations. More particularly, transmissions from the neighboring base stations will be jammed by the close-by base station—a classic near/far problem.

A power control system, as described in patents (give the QUALCOMM power control patent numbers), is necessary to solve the near/far problem for the mobile to base station communication link. As the mobile comes close to one base station, it reduces its transmitter power accordingly so as to achieve a just adequate Eb/No at the closest base station. This results in a lower Eb/No at the neighboring base stations, perhaps making it difficult to receive the mobile's signal at these locations. Thus, as a result of the power control system, neighboring base stations will typically have difficulty measuring mobile signal timing when a mobile unit is positioned near a close-by base station.

In the IS-95 CDMA system, the processing gain is nominally 21 dB. This is simply the ratio of the chip rate (1.2288 MHz) to the maximum data rate (9600 bps). At a point equidistant between two base stations, the transmitter power needed for both base stations is about the same. The resulting SNR at both base stations of the received mobile signal will likely be more than adequate to obtain good timing measurements. However, when the mobile station moves to a point closer to one base station than another, the transmitter power will be reduced. This will lower the received Eb/No at the further away base station. The measurement SNR can be raised by integrating over a longer time interval than a single bit time, effectively increasing the processing gain. For example, if the signal were to be integrated over one code repetition or 32768 chips, the SNR is improved by 24 dB compared to the SNR at 9600 bps because the processing gain becomes 45 dB (10*log 32768). If a 5 dB SNR is needed for good time tracking, then the signal at the far base station can be 30 dB weaker than the close base station. This SNR or better can be achieved in about 90% of the cell area, assuming 4th power propagation. Thus, in 90% of the system's coverage area, the base stations will be typically be capable of time difference measurements in support of positioning, provided that good base station geometry is available to obtain accurate positioning. The 10% of the cell area where time difference measurements between base stations is not available (with the above specified integration time) corresponds to the center of the cell area out to approximately 30% of the maximum cell radius. Thus, for base stations separated by 4 miles (2 mile cell radius) the radius of the area where positioning cannot be done with the above bandwidth assumptions is about 1000 meters.

It should be noted that there are limitations as to the time of integration that might be employed due to Doppler considerations. For example, if a mobile is traveling at 60 mph on a line between two base stations, the differential Doppler is about 2×10-7. This amounts to about 170 Hz in the 800 MHz cellular band. This is sufficient Doppler to make integration over 32768 chips somewhat difficult. Thus, the above estimates should be taken as best case.

The basic method of mobile station receive only positioning is described above. In this method, the mobile must receive three or more cell pilot signals from three or more nearby base stations and calculate time differences of arrival of the pilot signals. These arrival time differences allow hyperbolic lines of position to be determined, with the mobile terminal's position being where these hyperbolic lines intersect. However, for the reasons explained above, when the mobile is too close to a base station to obtain an adequate SNR on the two farther away cells, the required signal arrival time differences cannot be easily measured, and therefore some other method must be utilized to determine the position of the mobile station.

It is therefore an object of the present invention to provide a mobile radio positioning system, wherein the position of the mobile radio may determined if the mobile radio is positioned close-by to the closest base station.

These and other objects and advantages of the invention will become more fully apparent from the description and claims which follow or may be learned by the practice of the invention.

SUMMARY OF THE INVENTION

The present invention is directed to a method for determining the position of a mobile station within a cellular telephone system having first and second base stations. A round trip signal propagation time between the first base station and the mobile station is measured at the first base station. A first signal is transmitted from the first base station to the mobile station, and a second signal is transmitted from the second base station to the mobile station. An arrival time difference representing a time interval between a first relative time when the first signal is received at the mobile station and a second relative time when the second signal is received at the mobile station is measured at the mobile station. The position of the mobile station is determined in accordance with the round trip propagation time and the arrival time difference.

In accordance with a further aspect, the present invention is directed to a method for determining the position of a mobile station within a cellular telephone system having first and second base stations. A first round trip signal propagation time between the first base station and the mobile station is measured at the first base station. A second round trip signal propagation time between the second base station and the mobile station is measured at the second base station. The position of the mobile station is determined in accordance with the first and second round trip propagation times.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DESCRIPTION OF PREFERRED EMBODIMENTS

FIGS. 1–12 illustrate systems for positioning a mobile radio within a cellular telephone system, in accordance with preferred embodiments of the present invention. The positioning systems illustrated in FIGS. 1–12 are each preferably implemented as part of a cellular telephone system that uses spread spectrum modulation techniques for communicating between mobile units and base stations in the cellular telephone system. Exemplary telephone systems having mobile radio units and base stations that utilize such spread spectrum modulation (or CDMA) techniques for communicating within a cellular telephone system are disclosed in U.S. Pat. No. 5,103,459 entitled "System and Method for Generating Signal Waveforms in a CDMA Cellular system" and U.S. Pat. No. 5,109,390 entitled "Diversity Receiver in a Cellular Telephone System." The contents of U.S. Pat. Nos. 5,103,459 and 5,109,390 are hereby incorporated herein in their entirety by reference. Mobile radio units and base stations of the type disclosed in U.S. Pat. Nos. 5,103, 459 and 5,109,390 are shown in further detail inconnection with FIGS. 13–17 and will be referred to hereafter as CDMA mobile stations and CDMA base stations, respectively.

Figure 1:
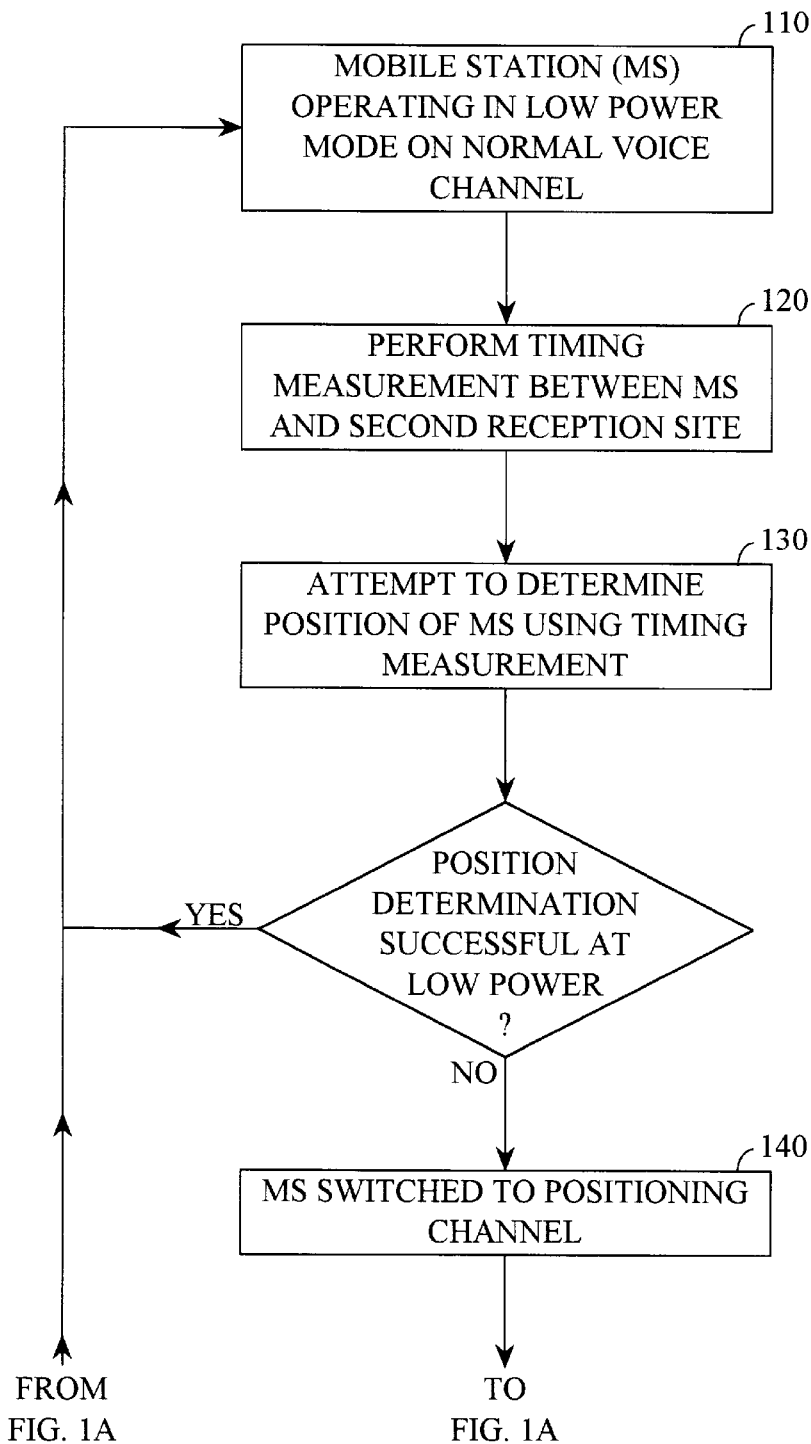
FIGS. 1 and 1A show the operation of a mobile radio positioning system where a mobile station is switched to a positioning channel and power transmissions from the mobile station are temporarily increased in order to allow timing measurements to be made between the mobile station and neighboring base stations, in accordance with a preferred embodiment of the present invention.
Figure 1A:
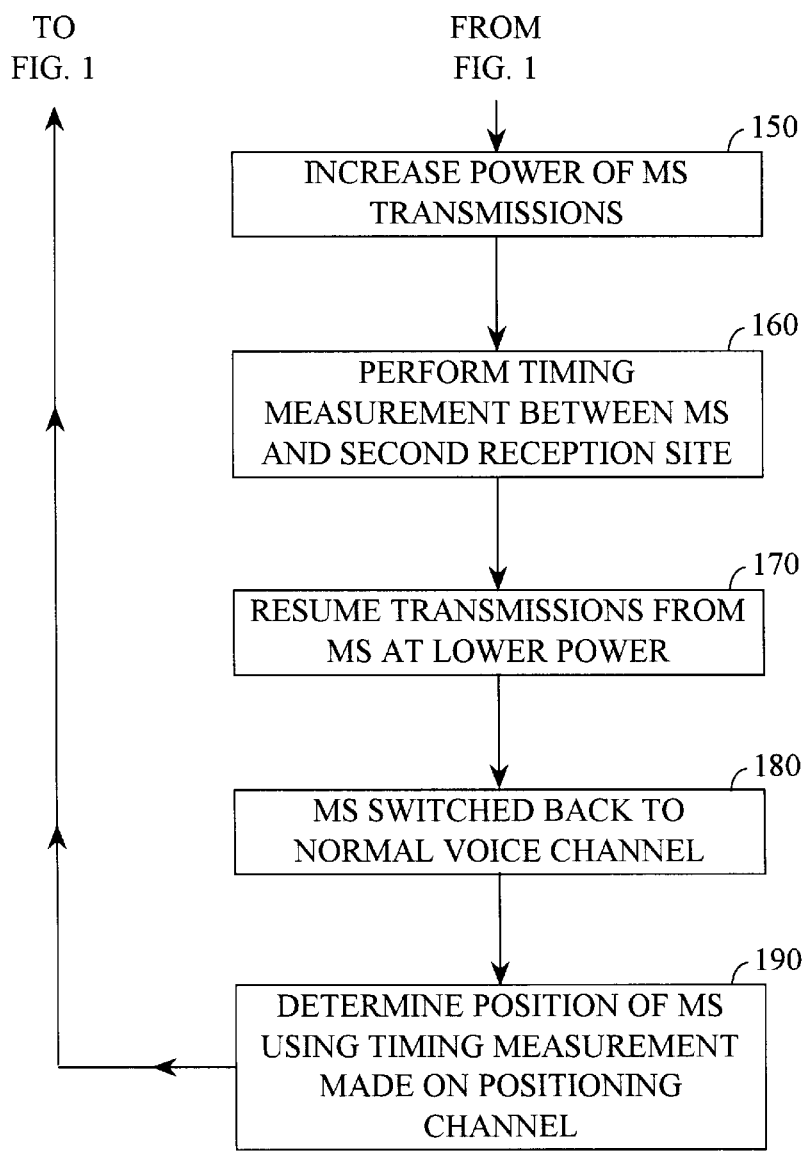

Referring now to FIGS. 1 and 1A, there is shown the operation of a mobile radio positioning system 100 where a CDMA mobile station is switched to a positioning channel and power transmissions from the CDMA mobile station are temporarily increased in order to allow timing measurements to be made between the mobile station and neighboring CDMA base stations, in accordance with a preferred embodiment of the present invention. Positioning system 100 is invoked initially at step 110 when a CDMA mobile station (or mobile radio) is in voice communication on a normal RF traffic channel with one or base stations in the cellular system. As explained above in the background, when the mobile station is operating on a normal RF traffic channel, its power level is carefully controlled and maintained at the lowest possible level in order to maintain a high traffic capacity. This low power level is sufficient to allow the mobile station to communicate on the normal RF traffic channel with a closest-by base station (or first base station). When the mobile station is in such communication with the closest-by base station, the closest-by base station uses its transmitter and receiver to perform a round trip time measurement which represents the time it takes for a radio signal to propagate from the closest-by base station to the mobile station and then from the mobile station back to the closest-by base station. More particularly, the base station transmitter has a transmission clock which supplies a transmission clock synchronization setting (or a relative transmission time) when a CDMA radio signal is transmitted by the base station. In addition, the base station receiver has means for demodulating a CDMA signal received back from a mobile station, and for determining a reception clock synchronization setting (or a relative reception time) associated with when such signal is received at the base station. In step 110, by comparing the difference between the transmission clock synchronization setting and the reception clock synchronization setting, the base station is able to perform a round trip time measurement which represents the time it takes for a radio signal to propagate from the base station to the mobile station and then from the mobile station back to the base station. By multiplying this round trip time measurement by the signal propagation speed (i.e., the speed of light), a relative distance between the mobile station and the closest-by base station can be determined. The round trip time measurement places the mobile station on a circle having a radius equal to such relative distance and centered about the closest-by base station.

Next, in step 120, the system attempts to perform a timing measurement between the mobile station and a neighboring base station (or second base station). In step 120, this measurement is attempted while the mobile station is operating on the normal RF traffic channel at low power. The timing measurement made in step 120 may consist of a round trip signal propagation time measurement between the mobile station and the second base station. Alternatively, the timing measurement which is attempted in step 120 may correspond to the time difference at which the signal from the mobile station is respectively received at the first and second base stations. By multiplying such an arrival time difference by the signal propagation speed (i.e., the speed of light), either a hyperbolic line of position for the mobile station between the first and second base station or a further circular line of position for the mobile station can be determined. Next, in step 130, the system attempts to determine the position of the mobile station based on the timing measurements made in steps 110 and 120. More particularly, the system attempts to find intersections between the circular line of position determined in step 110 and the circular (or hyperbolic) line of position determined in step 120. If the system finds more than one such intersection, the exact position of the mobile station may be resolved by using a sector antenna at one of the base stations to select the intersection that represents the true position of the mobile station in the cellular system. Alternatively, in the event that the system finds more than one such intersection, a further arrival time difference measurement between one of the first or second base stations and a third base station may be used to resolve the true position of the mobile station.

If the system was unable to successfully perform any timing measurement in step 120 because, for example, the mobile radio station was operating at a power level that was below the minimum power required for the second base station to properly receive the mobile station's signal, then processing proceeds to step 140 where the mobile radio station is switched from the normal RF traffic channel to a special RF positioning channel. This special RF positioning channel represents a normal CDMA channel having the capacity to support voice communication, but which is separate from the normal RF traffic channel used in steps 110–130. The same RF channel is preferably used for this special RF positioning channel throughout every cell in the CDMA cellular system. Thereafter, in step 150, while the mobile station is operating on the positioning channel, the power of the transmissions from the mobile station are increased to their maximum possible power level. While the transmissions from the mobile station are being made at this increased power level, a timing measurement is made in step 160 between the mobile station and a neighboring base station. The timing measurement made in step 160 is identical to that made in step 120, except that in step 160 the timing measurement is made using a signal that has been transmitted from the mobile unit at an increased power level. In steps 170 and 180, the power of transmissions from the mobile station are decreased to their normal low level and the mobile station is switched back to the normal RF traffic channel. The period of time between steps 150 and 170 during which the mobile station is operating at its increased power level should be sufficient to allow the timing measurement made in step 160 to be successfully completed, and this time period may be as short as the period of one voice frame in the signal transmitted from the mobile station.

Finally, in step 190, the system determines the position of the mobile station based on the timing measurements made in steps 110 and 160. More particularly, the system find one or more intersections between the circular line of position determined in step 110 and the circular (or hyperbolic) line of position determined in step 160. If the system finds more than one such intersection, the exact position of the mobile station may be resolved by using a sector antenna at one of the base stations to select the intersection that represents the true position of the mobile station in the cellular system. The process shown in FIGS. 1 and 1A is preferably repeated periodically in order to maintain current position information on a mobile station as it moves within the cellular system. The process may be repeated, for example, at a time interval equivalent to one out of every 100 voice frames in the signal transmitted by the mobile station, or alternatively, every one to three seconds.

It will be understood by those skilled in the art that the position calculations made in steps 130 and 190 may be performed either within one or more base stations or within the cellular system's switching center.

In the embodiment described above, the power of the transmissions from the mobile station are initially increased to their maximum possible power level in step 150. In an alternative preferred embodiment, the power level of the mobile station may be gradually ramped-up at, for example, 20 db intervals, until such time as the second base station can successfully perform the timing measurements required by step 160.

In the preferred embodiment of the present invention, a map matching table is used in steps 140 and 190 to improve the accuracy of the position determination made by the system. Since the timing measurements made by system 100 preferably correspond to signal propagation times (or differences in signal propagation times), positioning accuracy will be degraded by poor geometry between the mobile station and the base stations or by bent signal propagation paths. A map matching table is formed by assuming that the mobile station will be within a vehicle traveling on a public road and then compensating for poor base station geometry and bent propagation paths that will result in positional calculation errors at various points in such roads. A preferred method for developing such a map matching table would be to be perform a survey of an area by driving a mobile station along the various roads in the area. While the mobile station is being driven around, the timing measurements described above are performed at various locations in the area. In addition, at each such location, the actual position of the mobile station is determined by using, for example, GPS, and this actual position is stored as entry in the table along with the timing measurements performed at the location. The timing measurements made in steps 110, 120 and/or 160 are then compared to the timing measurements stored in the table, and the entries from the table which have timing measurements that most closely match the timing measurements made in steps 110, 120 and/or 160 are selected. The position of the mobile station is then determined by interpolating between the actual positions stored in the table for each of the selected entries.

Finally, although system 100 as described above has been implemented as part of a spread spectrum or CDMA cellular system, it will be understood by those skilled in the art that the steps of system 100 may be implemented in connection with other modulation systems such as, for example, time division multiple access modulation systems, in order to determine the position of mobile stations operating within such systems.

Figure 2:
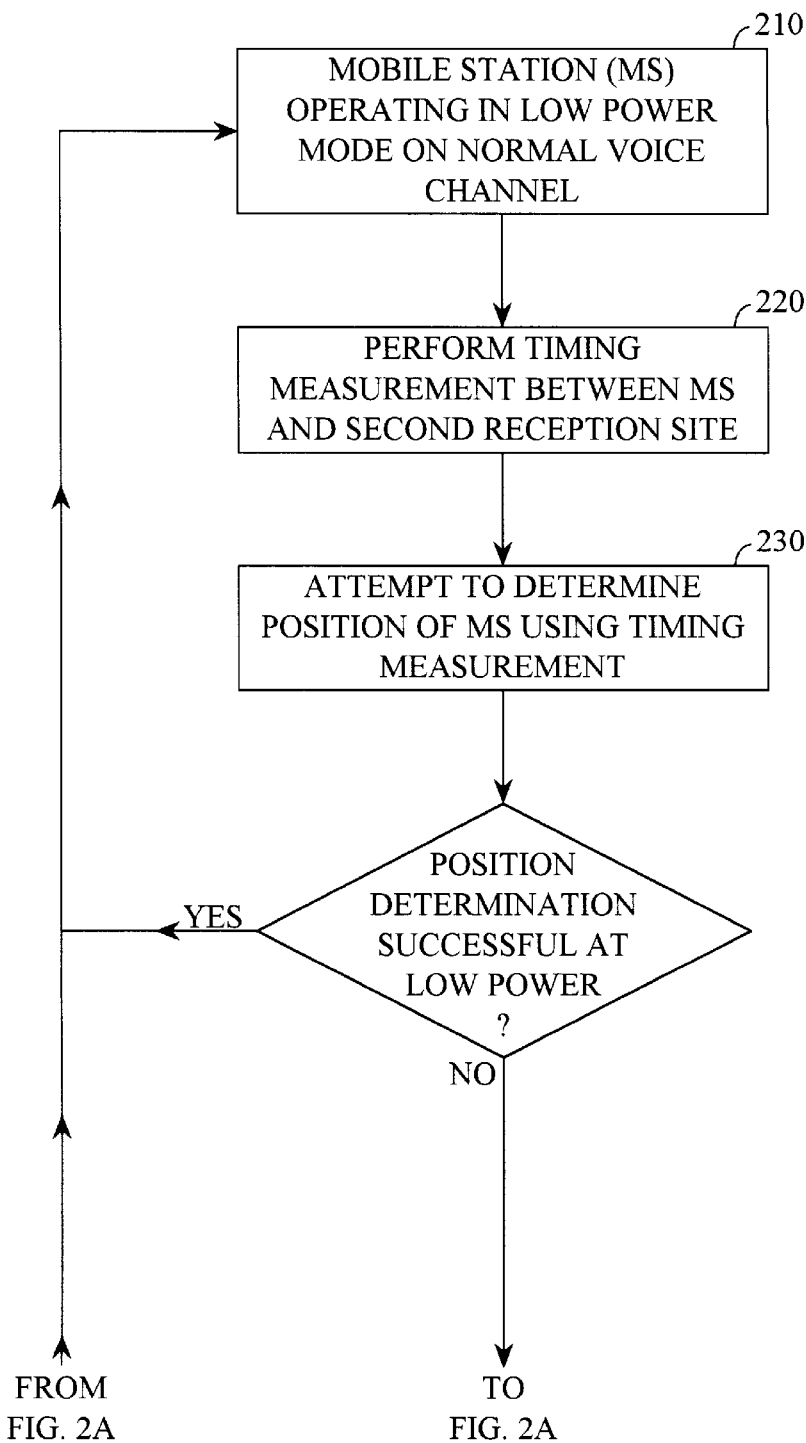
FIGS. 2 and 2A show the operation of a mobile radio positioning system where power transmissions from the mobile station are temporarily increased in order to allow timing measurements to be made between the mobile station and neighboring base stations, in accordance with a preferred embodiment of the present invention.
Figure 2A:
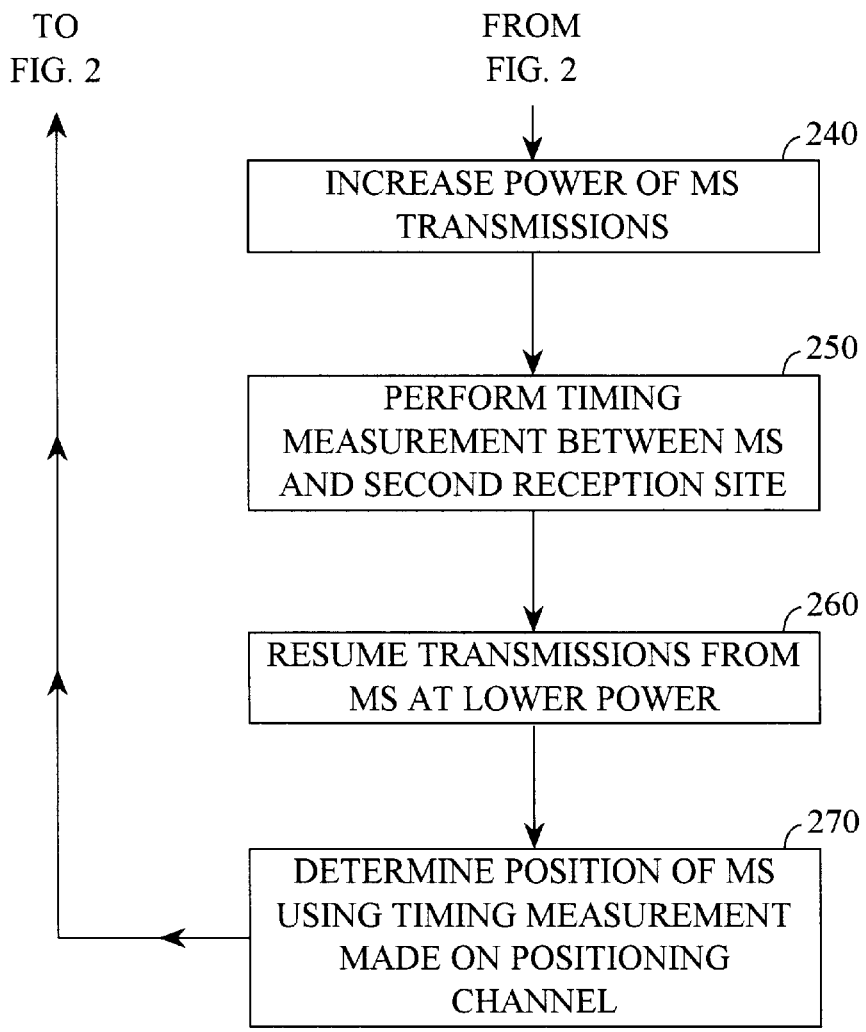

Referring now to FIGS. 2 and 2A, there is shown the operation of a mobile radio positioning system 200 where power transmissions from the mobile station are temporarily increased in order to allow timing measurements to be made between the mobile station and neighboring base stations, in accordance with a preferred embodiment of the present invention. System 200 functions substantially the same as system 100, except that in system 200 the mobile station is not switched to a separate positioning channel before its power level is increased so as to allow timing measurements to made at a second neighboring base station. Thus, steps 210, 220 and 230 correspond substantially to steps 110, 120 and 130, respectively, and steps 240, 250, 260 and 270 correspond substantially to steps 150, 160, 170 and 190 respectively. System 200 may have a disadvantage when compared against system 100 because, in system 200, other mobile stations operating on the normal RF traffic channel may suffer a frame error when the mobile station being positioned increases its power level between steps 240 and 260. However, CDMA systems are typically able to tolerate such an occasional frame error.

Figure 3:
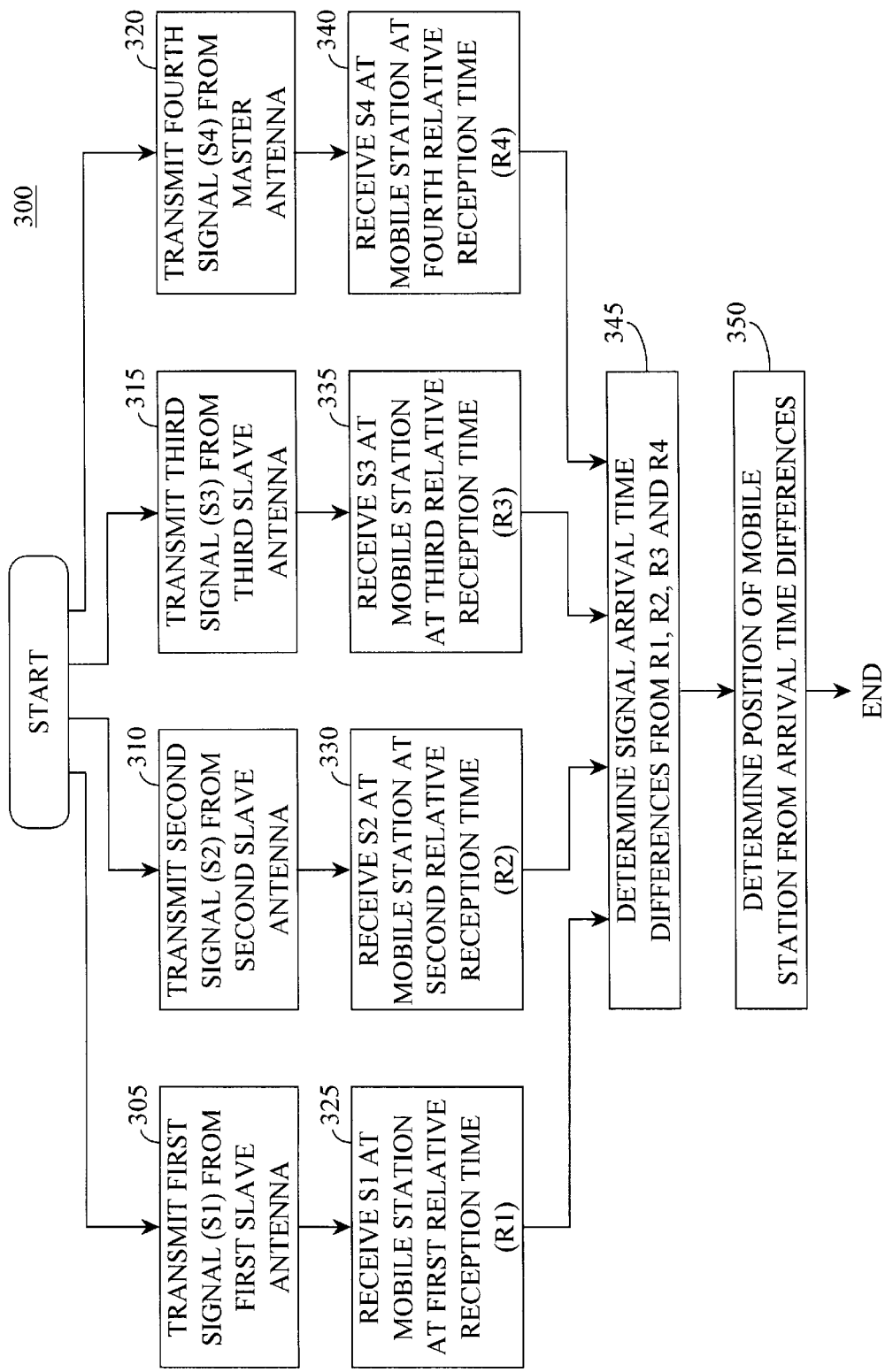
FIG. 3 shows the operation of a mobile radio positioning system where a base station having a "transmit-only" slave antenna is used for determining the mobile radio position, in accordance with a preferred embodiment of the present invention.

Referring now to FIG. 3, there is shown the operation of a mobile radio positioning system 300 where a base station having a "transmit-only" slave antenna is used for determining the mobile radio position, in accordance with a preferred embodiment of the present invention. In system 300, a modified CDMA base station is used in place of the normal CDMA base station. In this modified base station, two or more (and preferably three) transmit-only slave antennas are located proximate to (within approximately a few hundred feet of) the normal (or master) base station antenna. In the case of a three sector CDMA base station, three transmit-only slave antennas are preferably used, wherein each of the slave antennas is positioned in a different one of the three sectors. Each slave antenna has associated circuitry for transmitting CDMA signals; this associated circuitry will substantially resemble the signal transmission circuitry used for transmissions of CDMA signals from the master base station antenna. In steps 305, 310, 315 and 320, first, second, third and fourth different CDMA signals (each of which has a separate preassigned Walsh code) are respectively transmitted from the first, second and third slave antennas and the master antenna at the base station. The first, second, third and fourth signals are transmitted on a common CDMA traffic channel. In the event that the first, second and third signals are transmitted from slave antennas positioned in different sectors, the first, second and third signals will also have different pn code phases corresponding to the sectors from which such signals were transmitted. In steps 325, 330, 335 and 340, the four signals transmitted in steps 305, 310, 315 and 320 are respectively received by the mobile station. The mobile station has means for simultaneously demodulating multiple signals having different Walsh codes and different pn code phases, and for determining a clock synchronization setting (or a relative reception time) associated with each such signal. In step 345, by comparing the differences between the clock synchronization settings associated with the signals transmitted from the master antenna and the slave antennas, the mobile station is able to calculate arrival time differences corresponding to the relative times when the signals transmitted in steps 305, 310, 315 and 320 were received by the mobile station. Finally, in step 350, the arrival time differences for the signals transmitted in steps 305, 310, 315 and 320 are used to calculate at least two hyperbolic lines of position. The system then identifies one or more intersections between these hyperbolic lines of position. If the system finds more than one such intersection, the exact position of the mobile station may be resolved by using a sector antenna at the base station to select the intersection that represents the true position of the mobile station in the cellular system.

The positional calculation made in step 350 may be performed either in the mobile station, a base station or the system's switching center. In the event that the calculation is performed in the mobile station, the coordinates of the base station master antenna and the slave antennas will have to be transmitted to the mobile station before the mobile station will be able to determine the hyperbolic lines of positions described above. Alternatively, if the calculation is to be performed in the base station, the arrival time differences measured by the mobile unit will need to be transmitted to the base station before the positional calculation can be made. In the preferred embodiment of system 300, a map matching table (as described above) is used in step 350 to improve the accuracy of the position determination made by the system.

Figure 4:
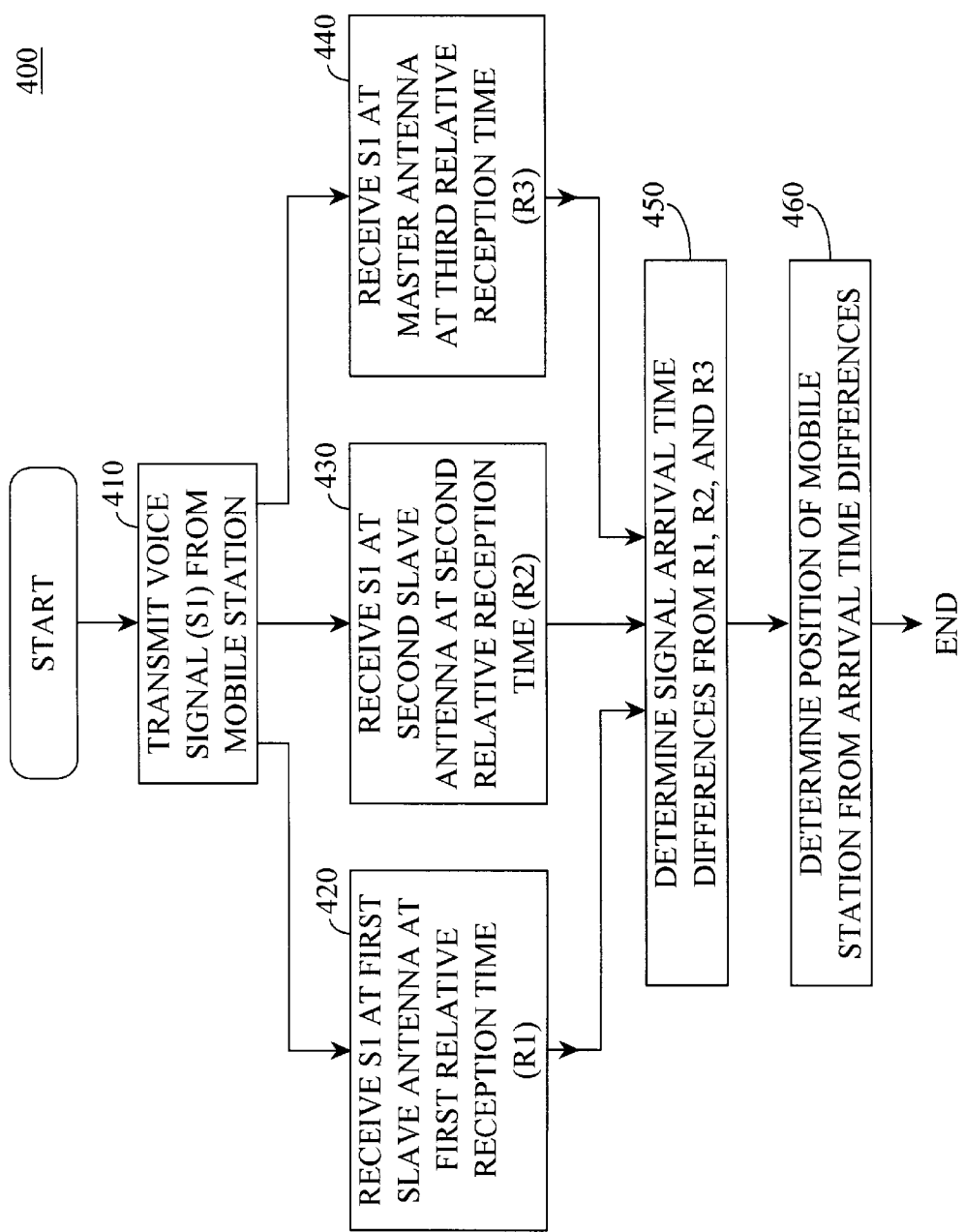
FIG. 4 shows the operation of a mobile radio positioning system where a base station having a "receive-only" slave antenna is used for determining the mobile radio position, in accordance with a preferred embodiment of the present invention.

Referring now to FIG. 4, there is show the operation of a mobile radio positioning system 400 where a base station having a "receive-only" slave antenna is used for determining the mobile radio position, in accordance with a preferred embodiment of the present invention. In system 400, a modified CDMA base station is used in place of the normal CDMA base station. In this modified base station, two or more receive-only slave antennas are located proximate to (within approximately a few hundred feet of) the normal (or master) base station antenna. Each slave antenna has associated circuitry for receiving CDMA signals; this associated circuitry will substantially resemble the signal reception circuitry used for receiving CDMA signals at the master base station antenna. In the case of a sectorized base station, it is preferable to have a receive-only slave antenna positioned within each sector. Thus, in the case of a three sector CDMA base station, three receive-only slave antennas are preferably used, wherein each of the slave antennas is positioned in a different one of the three sectors. In addition to performing the positioning function described below, these receive-only slave antennas can also be used as diversity antennas at the base station.

In step 410, the mobile station transmits a CDMA voice communication signal using the normal RF traffic channel. In steps 420, 430 and 440, the signal transmitted in step 410 is received at the base station by the first and second slave antennas and the master antenna, respectively. The two slave antennas and the master antenna each have means for demodulating the CDMA signal transmitted from the mobile station, and for determining a clock synchronization setting (or a relative reception time) associated with when the signal is received by each such antenna. In step 450, by comparing the differences between the clock synchronization settings associated with the signal received at the master antenna and the slave antennas, the base station is able to calculate arrival time differences corresponding to the relative times when the signal transmitted step 410 was received by the slave antennas and the master antenna at the base station. Finally, in step 460, the arrival time differences for the signal received in steps 420, 430 and 440 are used to calculate two hyperbolic lines of position. The system then identifies one or more intersections between these hyperbolic lines of position. If the system finds more than one such intersection, the exact position of the mobile station may be resolved by using a sector antenna at the base station to select the intersection that represents the true position of the mobile station in the cellular system.

It will be understood by those skilled in the art that the position calculations made in step 460 may be performed either within the base station or within the cellular system's switching center. In the preferred embodiment of system 400, a map matching table (as described above) is used in steps 450 and 460 to improve the accuracy of the position determination made by the system.

In an alternative embodiment of system 400, where the slave antennas were unable to receive the signal in steps 420 and 430, because, for example, the mobile radio station was operating at a power level that was below the minimum power required for the slave antennas to properly receive the mobile station's signal, then the power of the transmissions from the mobile station may be temporarily increased to a higher power level. In a preferred embodiment, this higher power level is achieved using the closed loop power control system installed in the CDMA base station. Typically, this power control system uses the signal received at the master base station antenna to adjust the power level of the mobile station. However, in the event that one or more of the slave antennas is unable to receive the mobile station in steps 420 and/or 430, the power control system preferably changes its input so as to use the weakest signal received at the slave antennas to adjust the power level of the mobile station. This method guarantees that the signal from the mobile station will be increased to a power level that is sufficient for reception at all the slave antennas. While the transmissions from the mobile station are being made at this increased power level, the timing measurements made in steps 420, 430 and 440 are then performed. Thereafter, the power of transmissions from the mobile station is decreased to the normal low level. As described above, the period of time during which the mobile station is operating at its increased power level should be sufficient to allow the timing measurements made in step 420, 430 and 440 to be successfully completed, and this time period may be as short as the period of one voice frame in the signal transmitted from the mobile station.

The process shown in FIGS. 3 and 4 are preferably repeated periodically in order to maintain current position information on a mobile station as it moves within the cellular system. Each process may be repeated, for example, at a time interval equivalent to one out of every 100 voice frames in the signal transmitted by the mobile station, or alternatively, every one to three seconds. Finally, although systems 300 and 400 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 5:
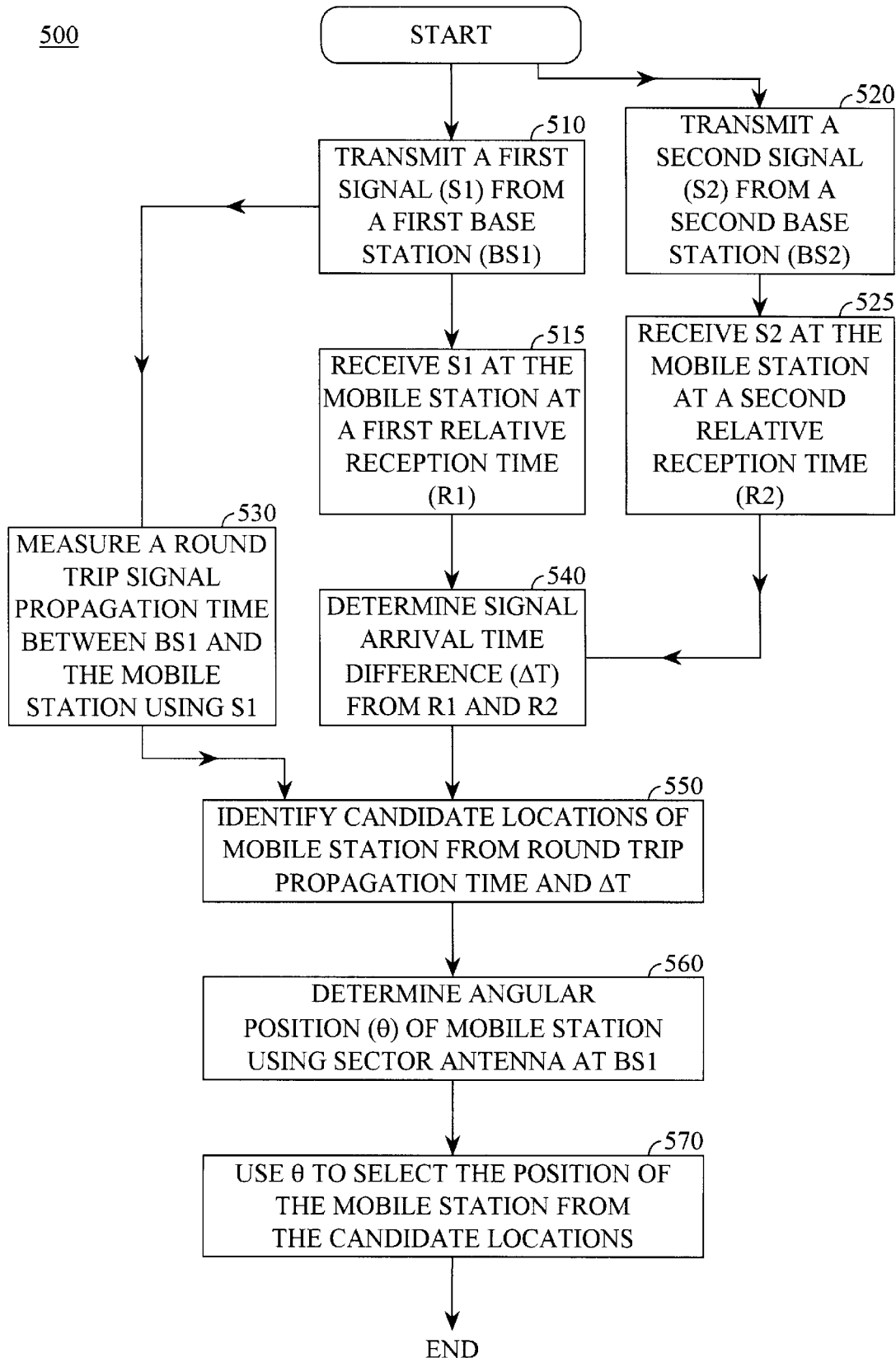
FIGS. 5–7 show the operation of mobile radio positioning systems wherein only two base stations are used for determining the position of a mobile station, in accordance with a preferred embodiment of the present invention.

Referring now to FIG. 5, there is shown the operation of mobile radio positioning system 500 wherein only two base stations are used for determining the position of a mobile station, in accordance with a preferred embodiment of the present invention. In steps 510 and 520, a first CDMA signal having a first Walsh code and a first pn code offset is transmitted from a first CDMA base station, and a second CDMA signal having a second (different) Walsh code and a second (different) pn code offset is transmitted from a second CDMA base station. The first and second signals are preferably transmitted on the normal RF traffic channel used by the first and second base stations for communicating with mobile stations in their respective areas. In steps 515 and 520, the two signals transmitted in steps 510 and 520 are respectively received by a mobile station. The mobile station has means for simultaneously demodulating multiple signals having different Walsh codes and different pn code offsets, and for determining a clock synchronization setting (or a relative reception time) associated with each such signal. In step 530, by comparing the differences between the clock synchronization settings associated with the signals transmitted from the first and second base stations, the mobile station is able to calculate an arrival time difference corresponding to the relative times when the two signals transmitted in steps 510 and 520 were received by the mobile station. This arrival time difference will place the mobile station on a hyperbolic line between the first and second base stations. Next, in step 530, the first base station will perform a round trip timing measurement between itself and the mobile station. As described above in connection with FIG. 1, such a round trip time measurement represents the time it takes for a radio signal to propagate from the first station to the mobile station and then from the mobile station back to the first station. By multiplying this round trip time measurement by the signal propagation speed (i.e., the speed of light), a relative distance between the mobile station and the first base station can be determined. The round trip time measurement thus places the mobile station on a circle having a radius equal to such relative distance and centered about the first base station.

Next, in step 550, the system identifies one or more intersections between the hyperbolic and circular lines of position which were determined based on the measurements made in steps 530 and 540. Each such intersection represents a candidate location where the mobile station may be located. If the system finds more than one such intersection, a sector antenna at one of the two base stations (or alternatively a sector antenna at a slave antenna) is used in step 560 to determine the angular sector in which the mobile is located. In a preferred embodiment, the sector antennas will divide their reception areas into three 120 degree sectors. If slave antennas are used in step 560, the boundary lines between such sectors will preferably point at other slave antennas in the system. Finally, in step 570, the position of the mobile station is determined by selecting the candidate location positioned within the sector identified in step 560. As described above in connection with FIGS. 1–4, the positional calculations made in steps 550 and 570 may be performed either within the mobile station or in one of the base stations.

Figure 6:
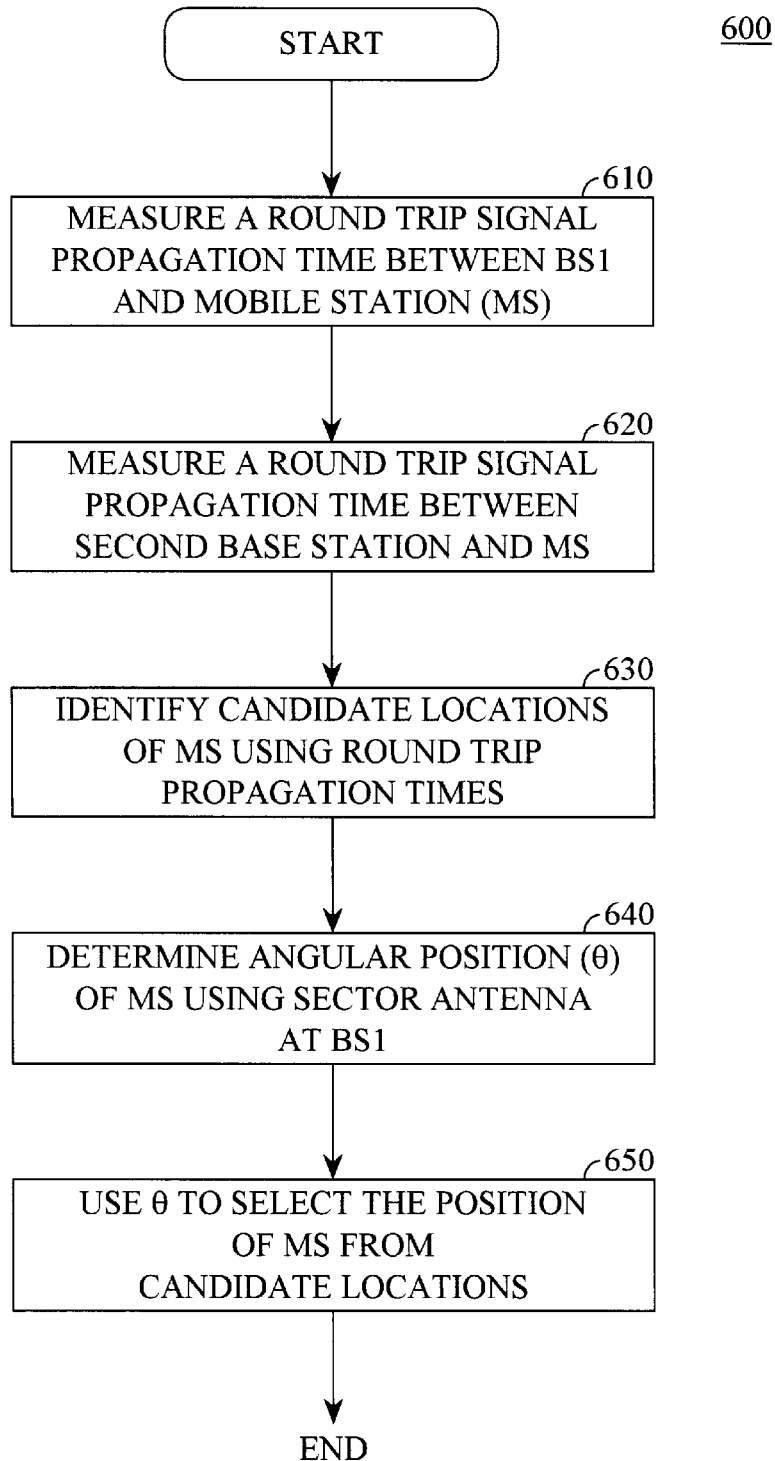

Referring now to FIG. 6, there is shown the operation of mobile radio positioning system 600 wherein only two base stations are used for determining the position of a mobile station, in accordance with an alternative preferred embodiment of the present invention. In step 610, a first base station performs a first round trip timing measurement between itself and the mobile station. As described above, this first round trip time measurement places the mobile station on a first circle centered about the first base station. Next, in step 620, a second base station performs a further round trip timing measurement between itself and the mobile station. This second round trip time measurement places the mobile station on a second circle centered about the second base station.

Next, in step 630, the system identifies one or more intersections between the first and second circular lines of position which were determined based on the measurements made in steps 610 and 620. Each such intersection represents a candidate location where the mobile station may be located. If the system finds more than one such intersection, a sector antenna at one of the two base stations (or alternatively a sector antenna at a slave antenna) is used in step 640 to determine the angular sector in which the mobile is located. In a preferred embodiment, the sector antennas will divide their reception areas into three 120 degree sectors. If slave antennas are used in step 640, the boundary lines between such sectors will preferably point at other slave antennas in the system. Finally, in step 650, the position of the mobile station is determined by selecting the candidate location positioned within the sector identified in step 640. As described above in connection with FIG. 14, the positional calculations made in steps 630 and 650 may be performed either within the mobile station or in one of the base stations. In addition, a map matching table may be used to enhance the accuracy of the candidate locations identified in step 630.

Figure 7:
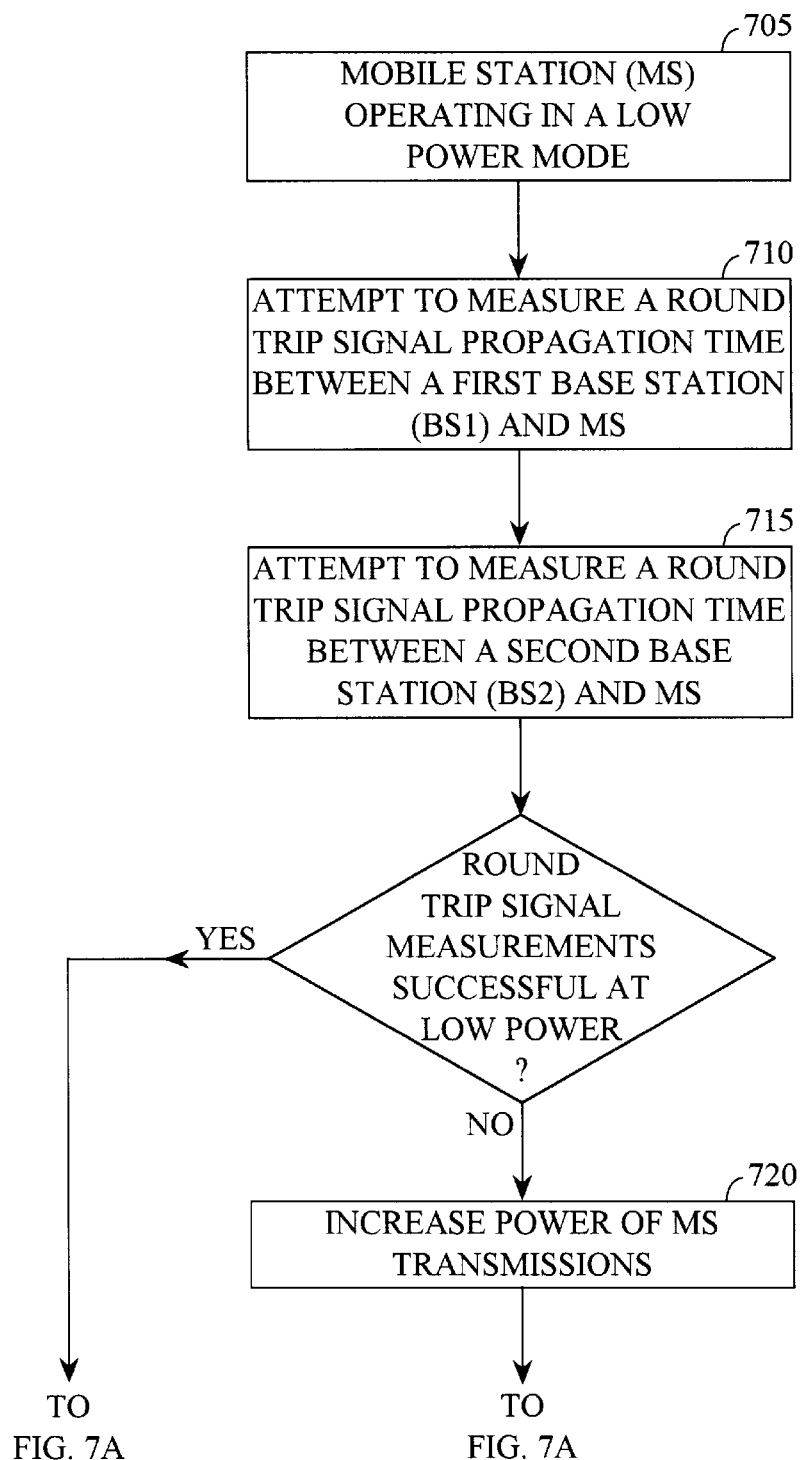
Figure 7A:
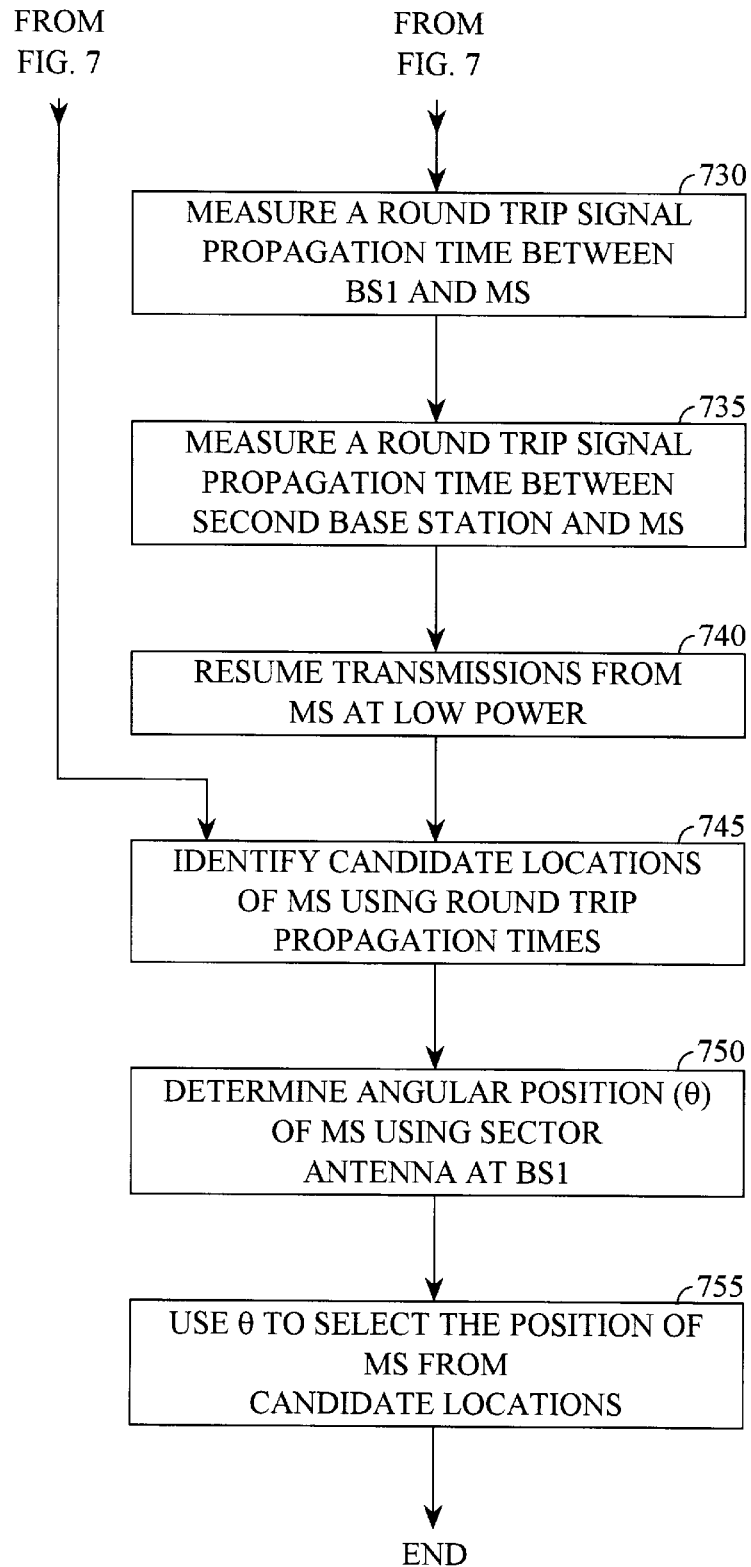

Referring now to FIG. 7, there is shown the operation of mobile radio positioning system 700 wherein only two base stations are used for determining the position of a mobile station, in accordance with a still further alternative preferred embodiment of the present invention. System 700 is similar to system 600, except in system 700, if the first and second base stations are unable to perform round trip timing measurements because the power level of the mobile station's transmissions is too low, the power level of the mobile station's transmissions is temporarily increased in order to allow such timing measurements to be made.

Referring still to FIG. 7, positioning system 700 is invoked initially at step 705 when a CDMA mobile station is in voice communication at low power on a normal RF traffic channel with one or base stations in the cellular system. This low power level is sufficient to allow the mobile station to communicate on the normal RF traffic channel with a closest-by base station (or first base station). In step 710, when the mobile station is in such communication with the first base station, the first base station uses its transmitter and receiver to attempt to perform a round trip time measurement which represents the time it takes for a radio signal to propagate from the first base station to the mobile station and from the mobile station back to the first base station. In step 720, while the mobile unit is still transmitting in its low power mode, a neighboring base station (or second base station) uses its transmitter and receiver to attempt to perform a round trip time measurement which represents the time it takes for a radio signal to propagate from the second base station to the mobile station and from the mobile station back to the second base station. If the system is able to successfully perform the round trip timing measurements in steps 710 and 715, processing proceeds to steps 745, 750 and 755, where the position of the mobile station is determined based on such round trip timing measurements. Steps 745, 750 and 755 determine the position of the mobile station in substantially the same manner as steps 630, 640 and 650, respectively, described above.

If system 700 was unable to successfully perform the timing measurements in steps 705 and 710 because, for example, the mobile radio station was operating at a power level that was below the minimum power required for the second base station to properly receive the mobile station's signal, then processing proceeds to step 720 where the power of the transmissions from the mobile station are increased to their maximum possible power level. While the transmissions from the mobile station are being made at this increased power level, the timing measurements that were attempted originally in steps 705 and 710 are made in steps 730 and 735. The timing measurements made in step 730 and 735 are identical to those attempted in steps 705 and 710, except that in steps 730 and 735 the timing measurements are made using a signal that has been transmitted from the mobile unit at an increased power level. Thereafter, in step 740, the power of transmissions from the mobile station are decreased to their normal low level, and the position of the mobile station is determined in accordance with steps 745, 750 and 755 as described above. In the preferred embodiment, the period of time between steps 720 and 740 during which the mobile station is operating at its increased power level corresponds to the period of one voice frame in the signal transmitted from the mobile station.

The process shown in FIG. 7 is preferably repeated periodically in order to maintain current position information on a mobile station as it moves within the cellular system. The process may be repeated, for example, at a time interval equivalent to one out of every 100 voice frames in the signal transmitted by the mobile station, or alternatively, every one to three seconds. In addition, although systems 500, 600 and 700 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 8:
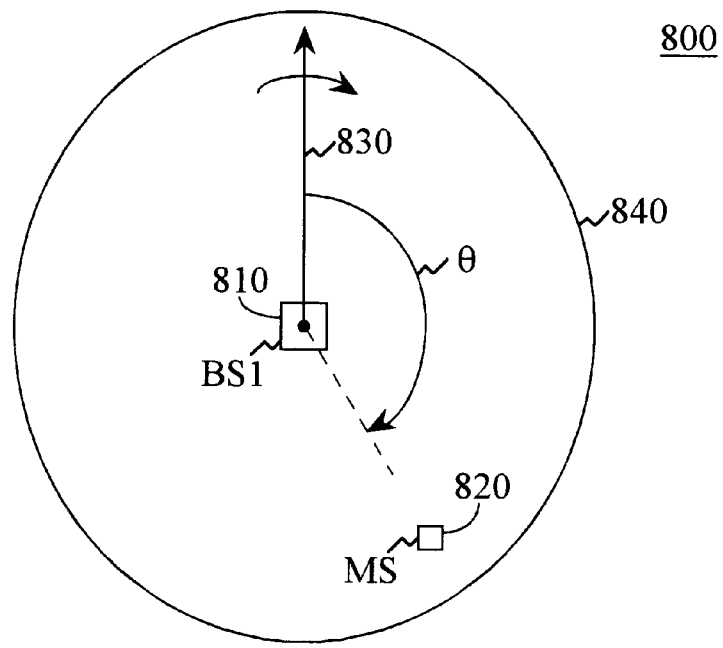
FIG. 8 shows a mobile radio positioning system that uses a base station having a rotating transmitting beam antenna for determining the position of the mobile radio, in accordance with a preferred embodiment of the present invention.

Referring now to FIG. 8, there is shown a mobile radio positioning system 800 that uses a CDMA base station 810 having a rotating transmitting beam antenna for determining the position of the mobile station 820, in accordance with a preferred embodiment of the present invention. In system 800, a signal having its own Walsh code is transmitted from a rotating antenna at base station 810. The rotating antenna has a beam 830 which rotates around a cell 840 in the cellular telephone system. The beam rotates at, for example, one rotation every two seconds. In the event that the beam is rotating through various sectors associated with base station 810, the pn code phase of the signal transmitted from the rotating antenna will change to reflect the sector that the beam is rotating through. Thus, in the case of a three-sector base station, the pn code phase of the rotating beam signal will change three times as the beam rotates one revolution around cell 840. In an alternate embodiment, both the pn code phase and the Walsh code of the rotating beam signal will change as the beam rotates around cell 840. The beam 830 has a rotational timing that is known by the mobile station 820. The mobile station receives this timing information from signals transmitted by base station 810 to mobile station 820. The rotating beam signal is received at the mobile station 820, and based on a reception time when either a null or a peak of the rotating beam signal is received by the mobile station 820, an angular displacement value ($\theta$) corresponding to the angular position of the mobile station 820 is determined. A first round trip signal propagation time between a stationary antenna (preferably located at base station 810) and the mobile station 820 is measured using a CDMA voice information signal transmitted from the base station. The position of the mobile station is determined in accordance with the angular displacement value and the first round trip signal propagation time. More particularly, the round trip propagation time is used as described above to place the mobile station 820 on a circle centered about the base station 810, and the angular displacement value ($\theta$) is used to identify the point along this circle where mobile station 820 is located. This calculation may be performed either in base station 810 or the cellular system's switching center. A map matching table (as described above) may also be used to enhance the accuracy of the position determination made by system 800.

Figure 9:
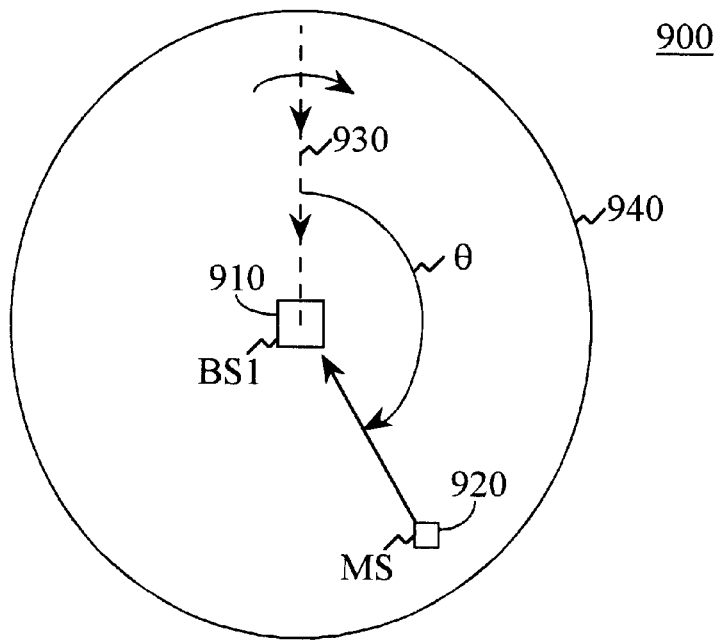
FIG. 9 shows a mobile radio positioning system that uses a base station having a rotating receiving beam antenna for determining the position of the mobile radio, in accordance with a preferred embodiment of the present invention.

Referring now to FIG. 9, there is shown a mobile radio positioning system 900 that uses a base station 910 having a rotating receiving beam antenna for determining the position of the mobile station 920, in accordance with a preferred embodiment of the present invention. In system 900, a CDMA voice information signal is transmitted from the mobile station 920. The voice information signal is received at base station 910 with a first antenna having a rotating beam 930 for receiving the signal. Beam 930 rotates about cell 940 at a regular interval. Based on a reception time when either a peak or null of the voice information signal is received by the first antenna, an angular displacement value ($\theta$) corresponding to the angular position of the mobile station 920 is determined. A round trip signal propagation time between a second antenna (preferably located at base station 910) and the mobile station 920 is measured. The position of the mobile station 920 is then determined in accordance with the angular displacement value (θ) and the measured round trip signal propagation time. More particularly, the round trip propagation time is used as to place the mobile station 920 on a circle centered about the base station 910, and the angular displacement value (θ) is used to identify the point along this circle where mobile station 920 is located. This calculation may be performed either in base station 910 or the cellular system's switching center. A map matching table (as described above) may also be used to enhance the accuracy of the position determination made by system 900.

Again, although systems 800 and 900 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 10:
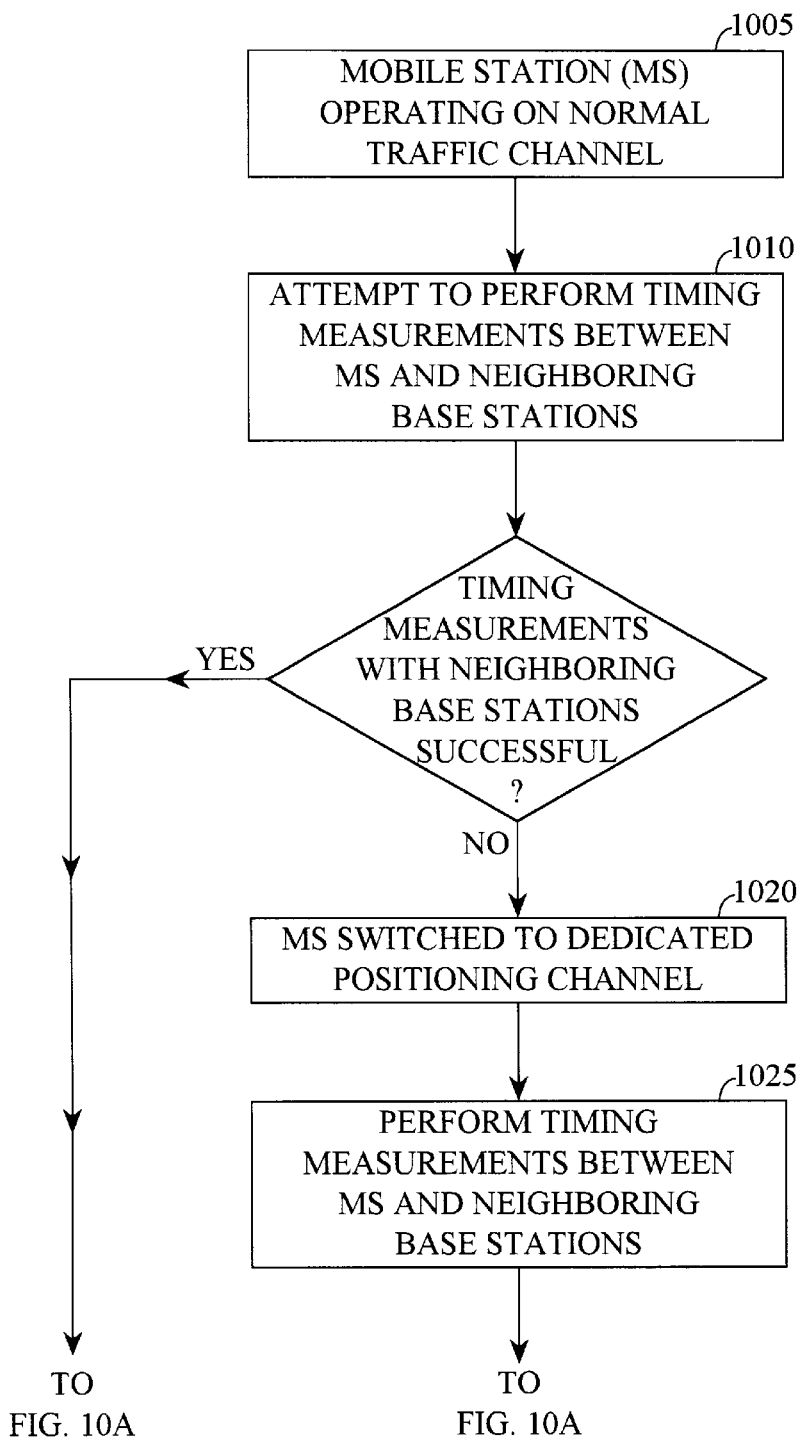
FIGS. 10 and 10A show the operation of a mobile radio positioning system wherein each cell in the cellular system has an RF channel that is dedicated for positioning uses and unavailable for voice communication, in accordance with a preferred embodiment of the present invention.
Figure 10A:
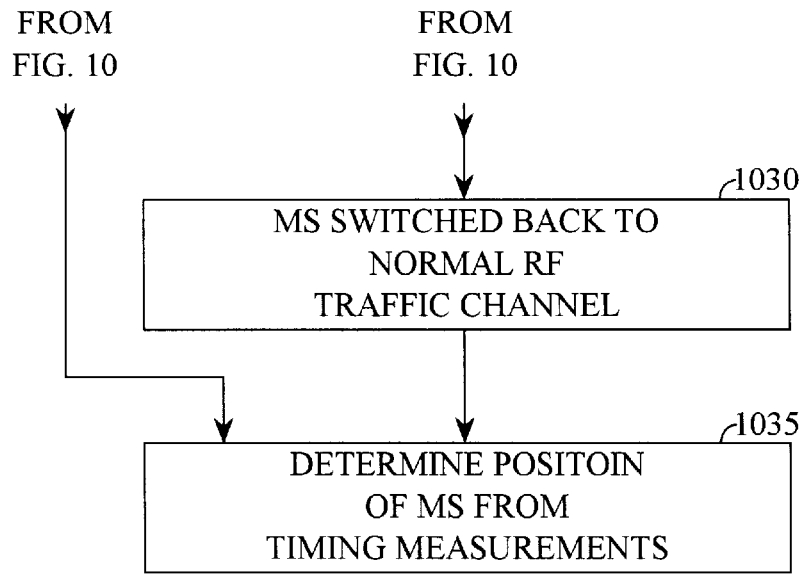

Referring now to FIGS. 10 and 10A, there is shown the operation of a mobile radio positioning system 1000 wherein each cell in the cellular system has an RF channel that is dedicated for positioning uses and unavailable for voice communication, in accordance with a preferred embodiment of the present invention. System 1000 is preferably implemented in connection with a CDMA cellular system in which each cell has a plurality of N (where N is an integer greater two) RF traffic channels, each of which has the capacity to support voice communications between a CDMA base station and a CDMA mobile station. In each cell, one of the N traffic channels is designated as a dedicated positioning channel that is normally unavailable for transmitting telephone voice information signals to mobile stations within the cell. As a result of this designated positioning channel, the CDMA base station associated with each cell in the system will have N−1 normal RF traffic channels that are available to support voice communications between the base station and a CDMA mobile station, and a single RF channel that is a dedicated positioning channel that is unavailable for supporting such voice communications. In the preferred embodiment of the present invention, the dedicated positioning channels are selected for the various cells in the system such that neighboring cells have different RF channels designated as their dedicated positioning channels.

Referring still to FIGS. 10 and 10A, system 1000 is initially invoked in step 1005 when a mobile station is communicating with a close-by base station (or first base station) on one of the normal RF traffic channels associated with the first base station. When the mobile station is in such communication with the first base station, the first base station performs a round trip time measurement which represents the time it takes for a radio signal to propagate from the first base station to the mobile station and then from the mobile station back to the first base station. This round trip time measurement thus places the mobile station on a circle centered about the first base station.

Next, in step 1010, the system attempts to perform a timing measurement between the mobile station and a neighboring base station (or second base station). In step 1010, this measurement is attempted while the mobile station is operating on a normal RF traffic associated with the first base station. The timing measurement made in step 1010 may consist of a round trip signal propagation time measurement between the mobile station and the second base station. Alternatively, the timing measurement which is attempted in step 1010 may correspond to the time difference at which the signal from the mobile station is respectively received at the first and second base stations. In the event that the system was able to successful perform such timing measurements in step 1010, processing proceeds to step 1035, where the system determines the position of the mobile station based on the timing measurements made in steps 1005 and 1010. More particularly, the system identifies one or more intersections between the circular line of position determined in step 1005 and the circular (or hyperbolic) line of position determined in step 1010. If the system finds more than one such intersection, the exact position of the mobile station may be resolved by using a sector antenna at one of the base stations to select the intersection that represents the true position of the mobile station in the cellular system.

If system 1000 was unable to successfully perform any timing measurement in step 1010 because, for example, the mobile radio station was operating at a power level that was below the minimum power required for the second base station to properly receive the mobile station's signal, then processing proceeds to step 1020 where the mobile radio station is switched from a normal RF traffic channel to the dedicated RF positioning channel associated with the first base station. While the mobile station is operating on this dedicated RF positioning channel, the mobile station can clearly receive transmissions from neighboring base stations. In step 1025, while the mobile station is on the dedicated positioning channel and able to hear such neighboring base stations, the mobile station measures an arrival time difference of signals transmitted from neighboring base stations (or, alternatively, an arrival time difference between a signal transmitted from a neighboring base station and a signal transmitted from the first base station). As described above, this arrival time difference, together with the coordinates of the appropriate base stations, can be used to place the mobile station on a hyperbola between such base stations. In steps 1030, the mobile station is switched back to a normal RF traffic channel. Finally, in step 1035 (the operation of which is described above), the system determines the position of the mobile station based on the timing measurements made in steps 1005 and 1025. The position calculations made in step 1035 may be performed either within one or more base stations or within the cellular system's switching center.

Figure 11:
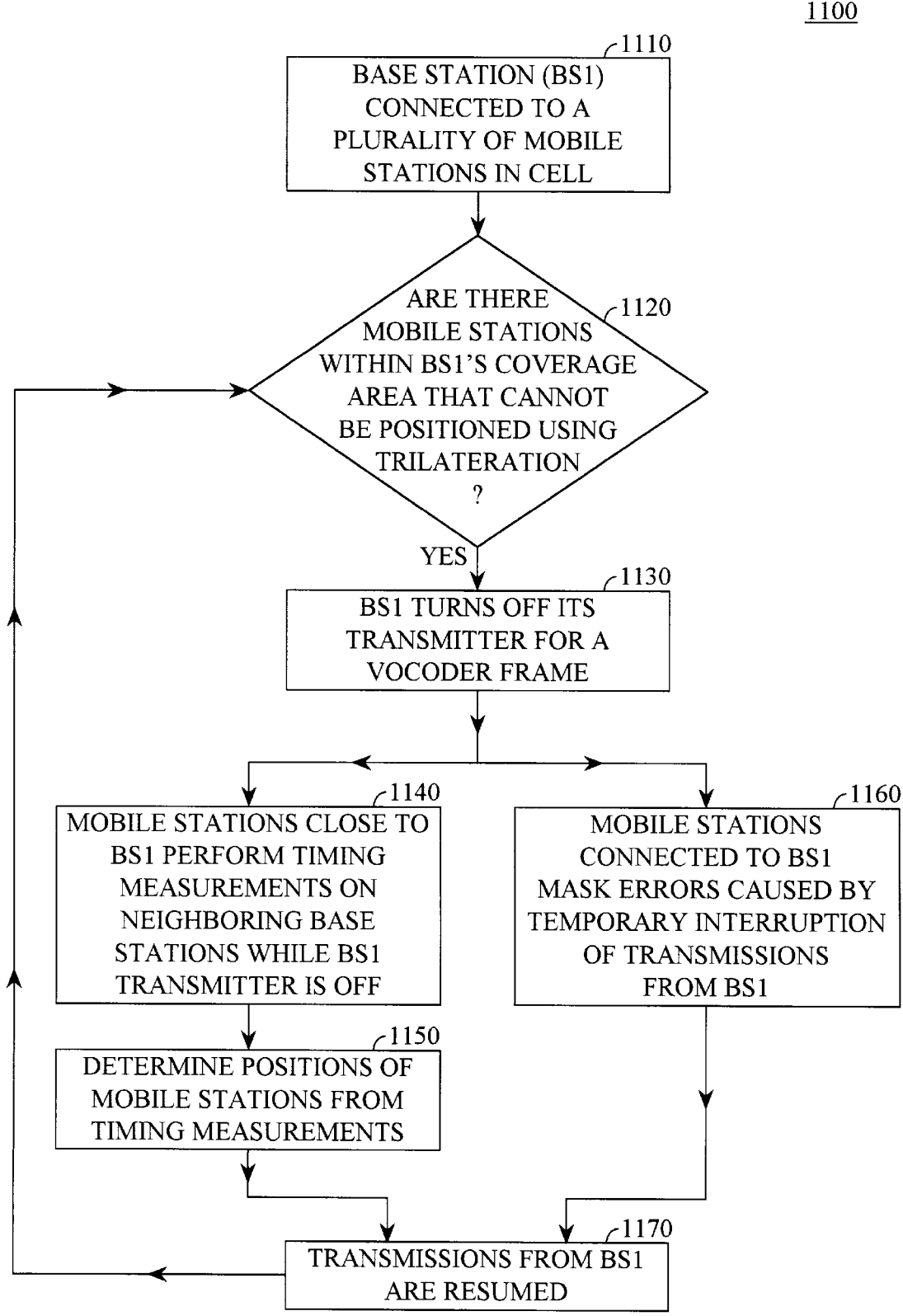
FIG. 11 shows the operation of a mobile radio positioning system where a base station transmitter turns itself off during predetermined periods to allow timing measurements to made between the mobile radio and neighboring base stations, in accordance with a preferred embodiment of the present invention.

Referring now to FIG. 11, there is shown the operation of a mobile radio positioning system 1100 where a base station transmitter turns itself off during predetermined periods to allow timing measurements to made between the mobile radio and neighboring base stations, in accordance with a preferred embodiment of the present invention. System 1100 begins at step 1110, when a first CDMA base station is in normal voice communication with a CDMA mobile station in the coverage area of the first base station. Next, in step 1120, while the first base station continues to transmit to mobile stations within its coverage area, a mobile station being positioned attempts to locate itself using trilateration, i.e, by attempting to measure signal arrival time differences between the first base station and two other neighboring base stations. Such positioning will be unsuccessful if the mobile station being positioned cannot make the required timing measurements with neighboring base stations. In the event such positioning is unsuccessful, processing proceeds to step 1130, where the first base station turns off its transmitter for a single vocoder frame. While the first base station's transmitter is silent, the mobile station being positioned measures arrival time differences of signals received from at least three neighboring base stations in step 1140. In addition, in step 1160, while the first base station's transmitter is silent, other mobile stations within the coverage area of the first base station mask any transmission errors caused by the temporary interruption of transmissions from the first base station transmitter for a vocoder frame. Next, in step 1150, the system determines the location of the mobile station being positioned based on the timing measurements made in step 1140. More particularly, the system identifies one or more intersections between hyperbolic lines of position defined by the timing measurements made in step 1140. If the system finds more than one such intersection, the exact position of the mobile station may be resolved by using a sector antenna at one of the base stations to select the intersection that represents the true position of the mobile station in the cellular system. The position calculation performed in step 1150 may be made either in the mobile station being positioned or in a base station. Moreover, a map matching table may be used as described above to enhance the accuracy of the mobile position determination made in step 1150. After the position of the mobile station is determined in step 1150, transmissions are resumed from the first base station to mobile stations within the coverage area of the first base station.

The process shown in FIG. 11 is preferably repeated periodically in order to maintain current position information on a mobile station as it moves within the cellular system. The process may be repeated, for example, at a time interval equivalent to one out of every 100 voice frames in the signal transmitted by the first base station, or alternatively, every one to three seconds. In addition, the time periods at which neighboring base stations cease transmissions in step 1130 are preferably gated such that adjacent base stations do not cease transmissions simultaneously. Finally, although system 1100 as described above is preferably implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 12:
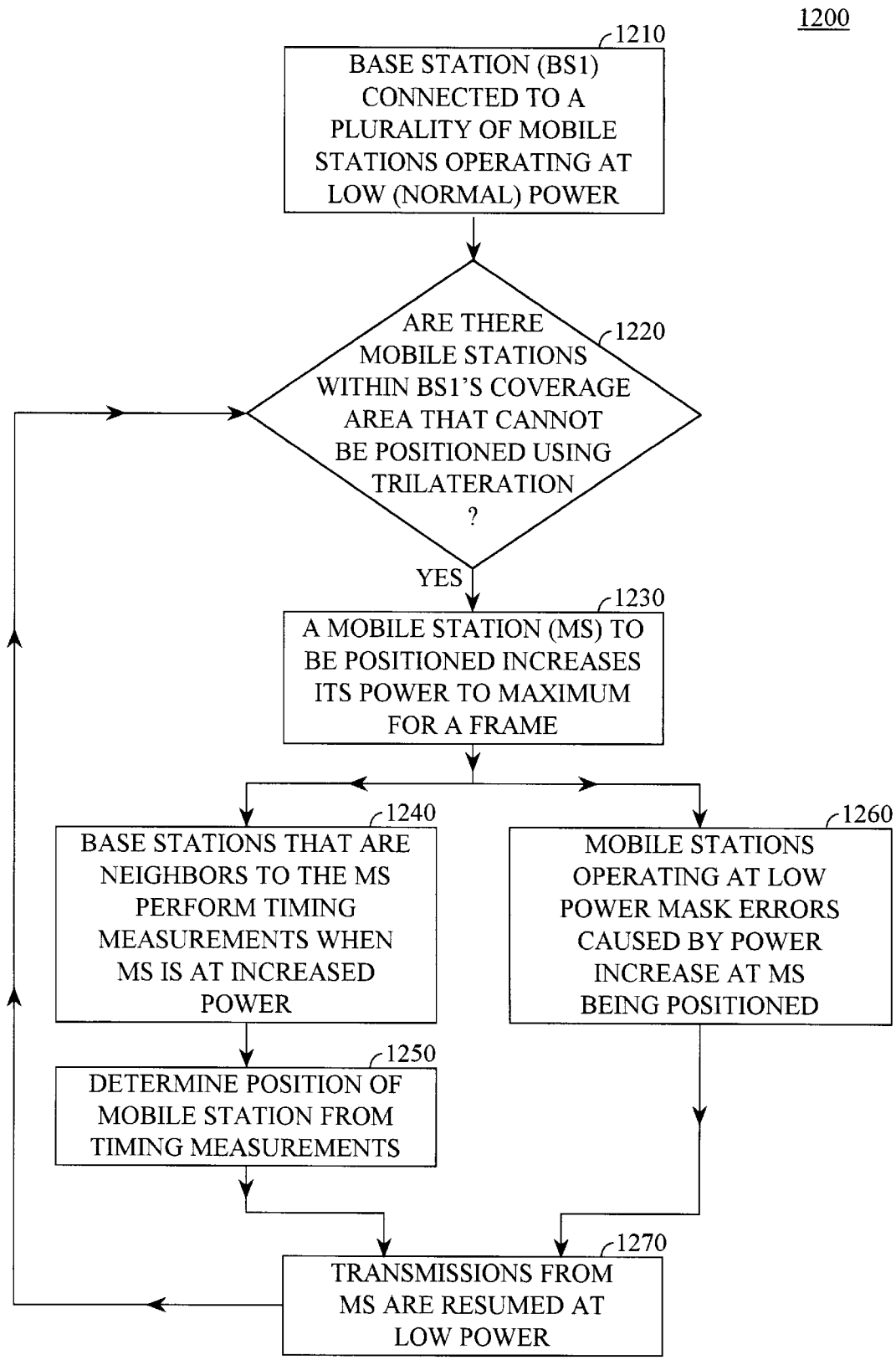
FIG. 12 shows the operation of a mobile radio positioning system where the power of a mobile station is temporarily increased for a frame in order to allow timing measurements to made between the mobile radio and neighboring base stations, in accordance with a preferred embodiment of the present invention.

Referring now to FIG. 12, there is shown the operation of a mobile radio positioning system 1200 where the power of a mobile station is temporarily increased for a frame in order to allow timing measurements to made between the mobile radio and neighboring base stations, in accordance with a preferred embodiment of the present invention. System 1200 begins at step 1210, when a first CDMA base station is in normal voice communication at a low power level with a CDMA mobile station in the coverage area of the first base station. Next, in step 1220, while the first base station continues to transmit to mobile stations within its coverage area, a mobile station being positioned attempts to locate itself using trilateration, i.e, by attempting to measure signal arrival time differences between the first base station and two other neighboring base stations. Step 1220 is substantially the same as step 1120 described in connection with FIG. 11 above. In the event such positioning is unsuccessful, processing proceeds to step 1230, where the CDMA mobile station being positioned increases its transmission power level to a maximum level for a single frame. In step 1240, while the mobile station's transmitter is at maximum power, at least three neighboring base stations measure arrival time differences of the signal transmitted from the mobile station at maximum power. In addition, in step 1260, while the mobile station's transmitter is at maximum power, other mobile stations operating at low power within the same cell as the mobile station being positioned mask any errors caused by the temporary increase in transmission power at the mobile station being positioned. Next, in step 1250, the system determines the location of the mobile station being positioned based on the timing measurements made in step 1240. More particularly, the system identifies one or more intersections between hyperbolic lines of position defined by the timing measurements made in step 1240. If the system finds more than one such intersection, the exact position of the mobile station may be resolved by using a sector antenna at one of the base stations to select the intersection that represents the true position of the mobile station in the cellular system. The position calculation performed in step 1250 may be made either in the mobile station being positioned or in a base station. Moreover, a map matching table may be used as described above to enhance the accuracy of the mobile position determination made in step 1250. After the position of the mobile station is determined in step 1250, transmissions are resumed at low power from the mobile station being positioned.

The process shown in FIG. 12 is preferably repeated periodically in order to maintain current position information on a mobile station as it moves within the cellular system. The process may be repeated, for example, at a time interval equivalent to one out of every 100 voice frames in the signal transmitted by the mobile station being positioned, or alternatively, every one to three seconds. In addition, although system 1200 as described above is preferably implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

General Operation of CDMA Base Stations and Mobile Units (FIGS. 13–17)

In a CDMA cellular telephone system, each cell-site has plurality of modulator-demodulator units or spread spectrum modems. Each modem consists of a digital spread spectrum transmit modulator, at least one digital spread spectrum data receiver and a searcher receiver. Each modem at the cell-site is assigned to a mobile unit as needed to facilitate communications with the assigned mobile unit.

In the CDMA cellular telephone system, each cell-site transmits a "pilot carrier" signal. Should the cell be divided into sectors, each sector has an associated distinct pilot signal within the cell. This pilot signal is used by the mobile units to obtain initial system synchronization and to provide robust time, frequency and phase tracking of the cell-site transmitted signals. Each cell-site also transmits spread spectrum modulated information, such as cell-site identification, system timing, mobile paging information and various other control signals.

The pilot signal transmitted by each sector of each cell is of the same spreading code but with a different code phase offset. Phase offset allows the pilot signals to be distinguished from one another thus distinguishing originating cell-sites or sectors. Use of the same pilot signal code allows the mobile unit to find system timing synchronization by a single search through all pilot signal code phases. The strongest pilot signal as determined by a correlation process for each code phase, is readily identifiable. The identified strongest pilot signal generally corresponds to the pilot signal transmitted by the nearest cell-site. However, the strongest pilot signal is used whether or not it is transmitted by the closest cell-site.

Upon acquisition of the strongest pilot signal, i.e., initial synchronization of the mobile unit with the strongest pilot signal, the mobile unit searches for another carrier intended to be received by all system users in the cell. This carrier, called the synchronization channel, transmits a broadcast message containing system information for use by the mobiles in the system. The system information identifies the cell-site and the system in addition to conveying information which allows the long PN codes, interleaver frames, vocoders and other system timing information used by the mobile unit to be synchronized without additional searching. Another channel, called the paging channel may also be provided to transmit messages to mobiles indicating that a call has arrived for them, and to respond with channel assignments when a mobile initiates a call.

Figure 13:
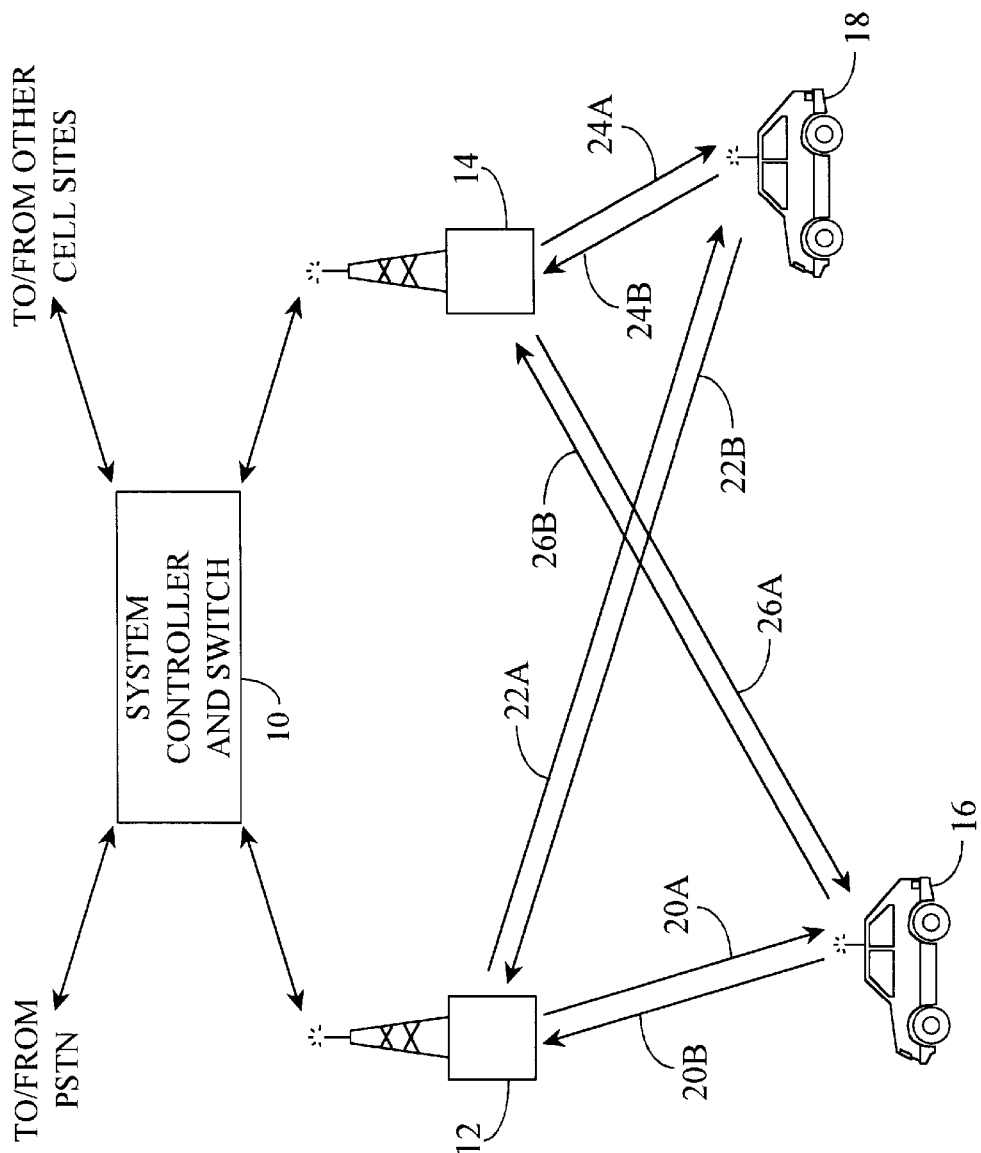
FIG. 13 is a schematic overview of an exemplary CDMA cellular telephone system in accordance with the present invention.

An exemplary telephone system in which the present invention is embodied is illustrated in FIG. 13. The system illustrated in FIG. 13 utilizes CDMA modulation techniques in communication between the system mobile units or mobile telephones, and the cell-sites. Cellular systems in large cities may have hundreds of cell-site stations serving hundreds of thousands of mobile telephones. The use of spread spectrum techniques, in particular CDMA, readily facilitates increases in user capacity in systems of this size as compared to conventional FM modulation cellular systems.

In FIG. 13, system controller and switch 10, also referred to as mobile telephone switching office (MTSO), typically includes interface and processing circuitry for providing system control to the cell-sites. Controller 10 also controls the routing of telephone calls from the public switched telephone network (PSTN) to the appropriate cell-site for transmission to the appropriate mobile unit. Controller 10 also controls the routing of calls from the mobile units, via at least one cell-site to the PSTN. Controller 10 may connect calls between mobile users via the appropriate cell-sites since the mobile units do not typically communicate directly with one another.

Controller 10 may be coupled to the cell-sites by various means such as dedicated telephone lines, optical fiber links or microwave communication links. In FIG. 13, two such exemplary cell-sites 12 and 14 including, along with mobile units 16 and 18 each including a cellular telephone are illustrated. Cell-sites 12 and 14 as discussed herein and illustrated in the drawings are considered to service an entire cell. However it should be understood that the cell may be geographically divided into sectors with each sector treated as a different coverage area. Accordingly, handoffs are made between sectors of a same cell as is described herein for multiple cells, while diversity may also be achieved between sectors as is for cells.

In FIG. 13, arrowed lines 20a–20b and 22a–22b respectively define the possible communication links between cell-site 12 and mobile unit 16 and 18. Similarly, arrowed lines 24a–24b and 26a–26b respectively define the possible communication links between cell-site 14 and mobile units 16 and 18. Cell-sites 12 and 14 nominally transmit using equal power.

All the cells in a service area are supplied with accurate synchronization. In the preferred embodiment, a GPS receiver at each cell synchronizes the local waveform timing to Universal Coordinated Time (UTC). The GPS system allows time synchronization to better than 1 microsecond accuracy. Accurate synchronization of cells is desirable in order to allow easy handoff of calls between cells when mobiles move from one cell to another with a call in progress. If the neighboring cells are synchronized, the mobile unit will not have difficulty synchronizing to the new cell thereby facilitating a smooth handoff.

The pilot carrier is transmitted at a higher power level than a typical voice carrier so as to provide greater signal to noise and interference margin for this signal. The higher power level pilot carrier enables the initial acquisition search to be done at high speed and to make possible a very accurate tracking of the carrier phase of the pilot carrier by a relatively wide bandwidth phase tracking circuit. The carrier phase obtained from tracking the pilot carrier is used as the carrier phase reference for demodulation of the carriers modulated by user information signals. This technique allows many user carriers to share the common pilot signal for carrier phase reference. For example, in a system transmitting a total of fifteen simultaneous voice carriers, the pilot carrier might be allocated a transmit power equal to four voice carriers.

In addition to the pilot carrier, another carrier intended to be received by all system users in the cell is transmitted by the cell-site. This carrier, called the synchronization channel, also uses the same 32,768 length PN sequence for spectrum spreading but with a different, pre-assigned Walsh sequence. The synchronization channel transmits a broadcast message containing system information for use by the mobiles in the system. The system information identifies the cell-site and the system and conveys information allowing the long PN codes used for mobile information signals to be synchronized without additional searching.

Another channel, called the paging channel may be provided to transmit messages to mobiles indicating that a call has arrived for them, and to respond with channel assignments when a mobile initiates a call.

Each voice carrier transmits a digital representation of the speech for a telephone call. The analog speech waveform is digitized using standard digital telephone techniques and then compressed using a vocoding process to a data rate of approximately 9600 bits per second. This data signal is then rate r=1/2, constraint length K=9 convolutional encoded, with repetition, and interleaved in order to provide error detection and correction functions which allow the system to operate at a much lower signal-to-noise and interference ratio. Techniques for convolutional encoding, repetition and interleaving are well known in the art.

The resulting encoded symbols are multiplied by an assigned Walsh sequence and then multiplied by the outer PN code. This process results in a PN sequence rate of 1.2288 MHz or 128 times the 9600 bps data rate. The resulting signal is then modulated onto an RF carrier and summed with the pilot and setup carriers, along with the other voice carriers. Summation may be accomplished at several different points in the processing such as at the IF frequency, or at the baseband frequency either before or after multiplication by the PN sequence.

Each voice carrier is also multiplied by a value that sets its transmitted power relative to the power of the other voice carriers. This power control feature allows power to be allocated to those links that require higher power due to the intended recipient being in a relatively unfavoring location. Means are provided for the mobiles to report their received signal-to-noise ratio to allow the power to be set at a level so as to provide adequate performance without waste. The orthogonality property of the Walsh functions is not disturbed by using different power levels for the different voice carriers provided that time alignment is maintained.

Figure 14:
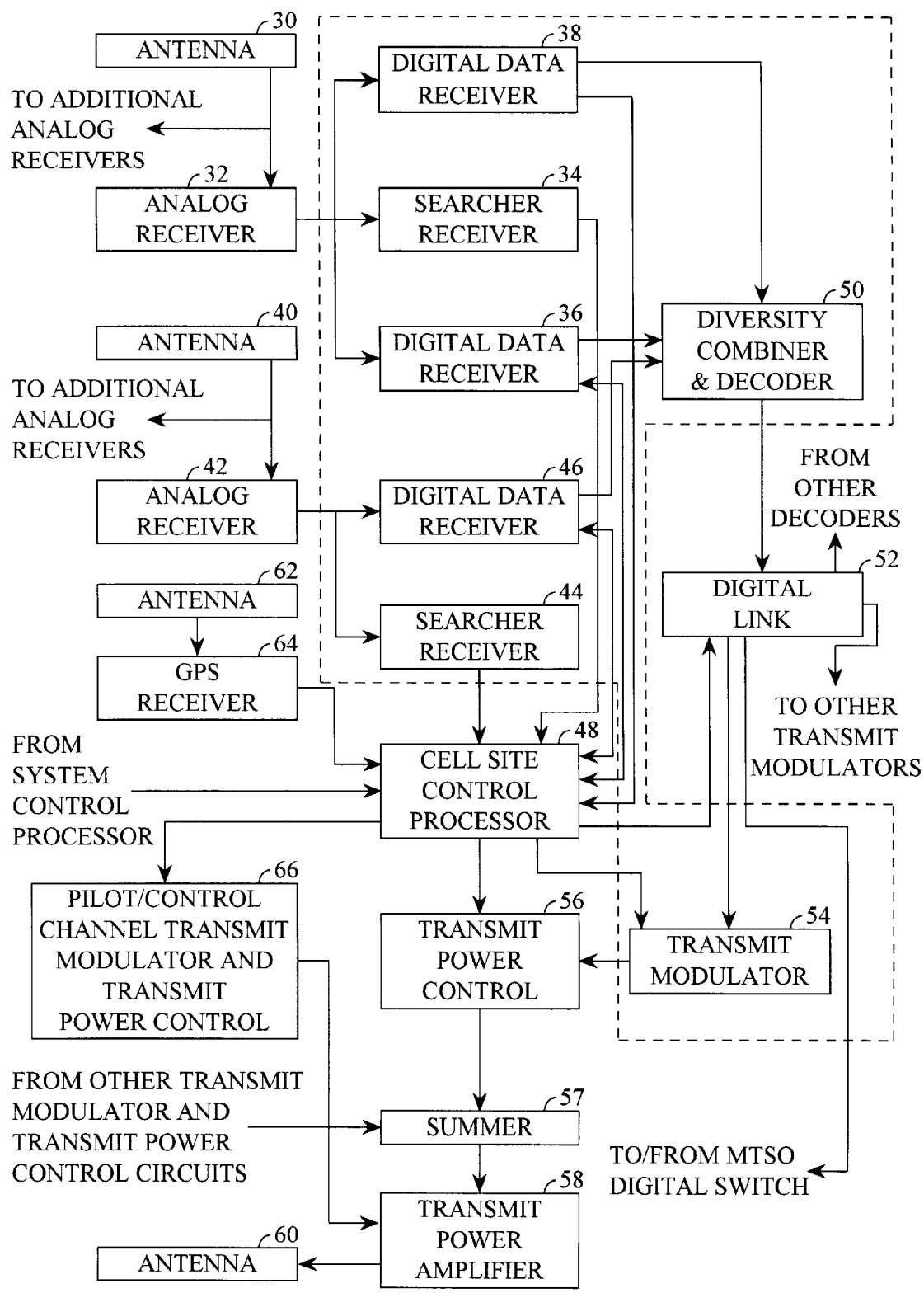
FIG. 14 is a block diagram of the cell-site equipment as implemented in the CDMA cellular telephone system.

FIG. 14 illustrates in block diagram form an exemplary embodiment of the cell-site equipment. At the cell-site, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the cell-site and one mobile unit. The output of the analog receivers are also provided to other elements used in communications with other mobile units.

In FIG. 14, the first receiver system is comprised of antenna 30, analog receiver 32, searcher receiver 34 and digital data receiver 36. The first receiver system may also include an optional digital data receiver 38. The second receiver system includes antenna 40, analog receiver 42, searcher receiver 44 and digital data receiver 46.

The cell-site also includes cell-site control processor 48. Control processor 48 is coupled to data receivers 36, 38 and 46 along with searcher receivers 34 and 44. Control processor 48 provides among other functions, functions such as signal processing; timing signal generation; power control; and control over handoff, diversity, diversity combining and system control processor interface with the MTSO. Walsh sequence assignment along with transmitter and receiver assignment is also provided by control processor 48.

Both receiver systems are coupled by data receivers 36, 38 and 46 to diversity combiner and decoder circuitry 50. Digital link 52 is coupled to receive the output of diversity combiner and decoder circuitry 50. Digital link 52 is also coupled to control processor 48, cell-site transmit modulator 54 and the MTSO digital switch. Digital link 52 is utilized to communicate signals to and from the MTSO with cell-site transmit modulator 54 and circuitry 50 under the control of control processor 48.

The mobile unit transmitted signals are direct sequence spread spectrum signals that are modulated by a PN sequence clocked at a predetermined rate, which in the preferred embodiment is 1.2288 MHz. This clock rate is chosen to be an integer multiple of the baseband data rate of 9.6 Kbps.

Signals received on antenna 30 are provided to analog receiver 32. The details of receiver 32 are further illustrated in FIG. 15. Signals received on antenna 30 are provided to downconverter 101 which is comprised of RF amplifier 102 and mixer 104. The received signals are provided as an input to RF amplifier where they are amplified and output to an input to mixer 104. Mixer 104 is provided another input, that being the output from frequency synthesizer 106. The amplified RF signals are translated in mixer 104 to an IF frequency by mixing with the frequency synthesizer output signal.

The IF signals are then output from mixer 104 to bandpass filter (BPF) 108, typically a Surface Acoustic Wave (SAW) filter having a passband of 1.25 MHz, where they are bandpass filtered. The filtered signals are output from BPF 108 to IF amplifier 110 where the signals are amplified. The amplified IF signals are output from IF amplifier 110 to analog to digital (A/D) converter 112 where they are digitized at a 9.8304 MHz clock rate which is exactly 8 times the PN chip rate. Although (A/D) converter 112 is illustrated as part of receiver 32, it could instead be a part of the data and searcher receivers. The digitized IF signals are output from (A/D) converter 112 to data receiver 36, optional data receiver 38 and searcher receiver 34. The signals output from receiver 32 and I and Q channel signals as discussed later. Although as illustrated in FIG. 3 with A/D converter 112 being a single device, with later splitting of the I and Q channel signals, it is envisioned that channel splitting may be done prior to digitizing with two separate A/D converters provided for digitizing the I and Q channels. Schemes for the RF-IF-Baseband frequency downconversion and analog to digital conversion for I and Q channels are well known in the art.

Searcher receiver 34 is used to at the cell-site to scan the time domain about the received signal to ensure that the associated digital data receiver 36, and data receiver 38 if used, are tracking and processing the strongest available time domain signal. Searcher receiver 64 provides a signal to cell-site control processor 48 which provides control signals to digital data receivers 36 and 38 for selecting the appropriate received signal for processing.

The signal processing in the cell-site data receivers and searcher receiver is different in several aspects than the signal processing by similar elements in the mobile unit. In the inbound, i.e., reverse or mobile-to-cell link, the mobile unit does not transmit a pilot signal that can be used for coherent reference purposes in signal processing at the cell-site. The mobile-to-cell link is characterized by a non-coherent modulation and demodulation scheme using 64-ary orthogonal signaling.

In the 64-ary orthogonal signaling process, the mobile unit transmitted symbols are encoded into one of $2^6$, i.e., 64, different binary sequences. The set of sequences chosen are known as Walsh functions. The optimum receive function for the Walsh function m-ary signal encoding is the Fast Hadamard Transform (FHT).

Referring again to FIG. 14, searcher receiver 34 and digital data receivers 36 and 38, receive the signals output from analog receiver 32. In order to decode the spread spectrum signals transmitted to the particular cell-site receiver through which the mobile unit communicates, the proper PN sequences must be generated. Further details on the generation of the mobile unit signals are discussed later herein.

Figure 15:
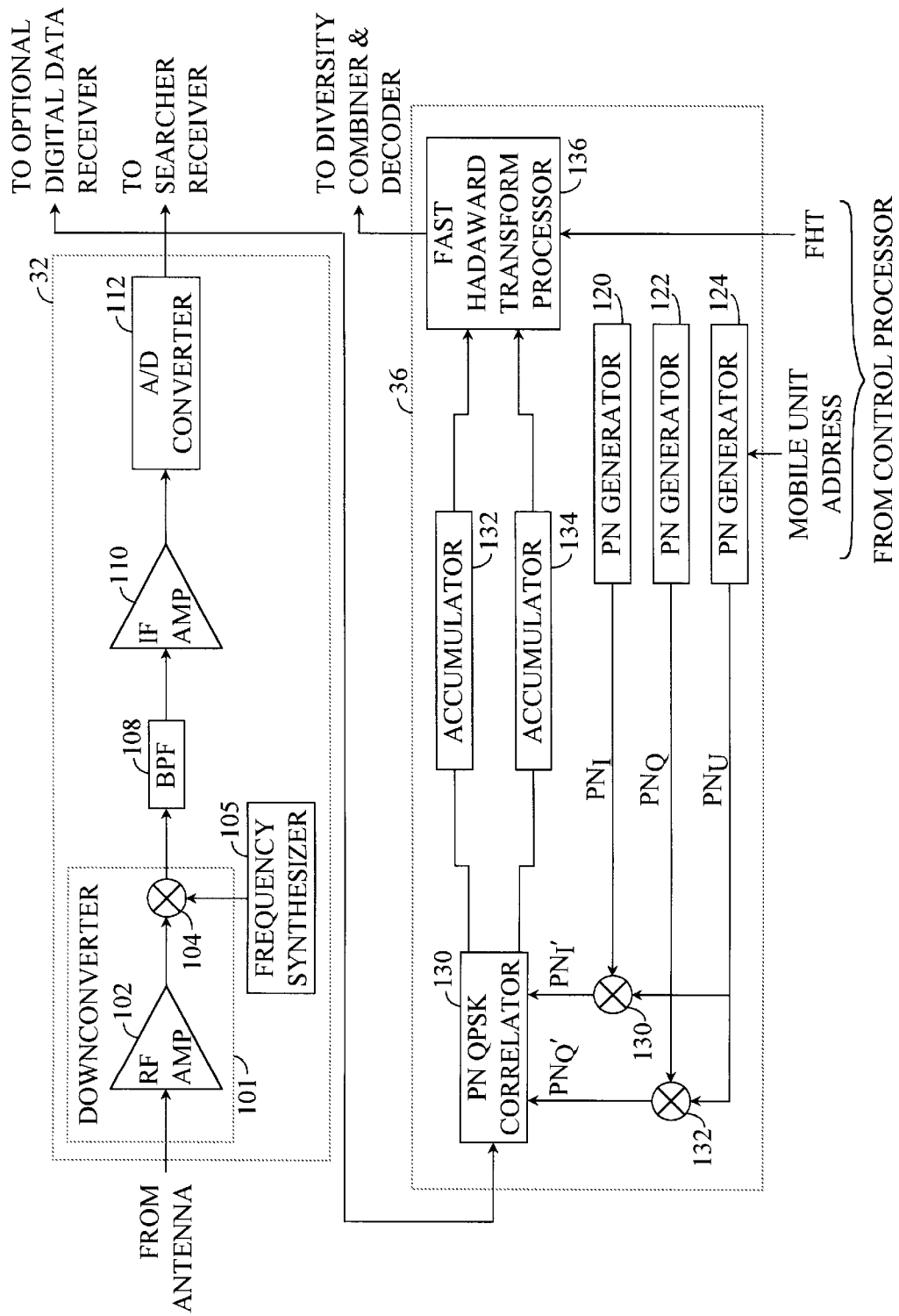
FIG. 15 is a block diagram of the cell-site receiver.

As illustrated in FIG. 15, receiver 36 includes two PN generators, PN generators 120 and 122, which generate two different short code PN sequences of the same length. These two PN sequences are common to those of all cell-site receivers and all mobile units with respect to the outer code of the modulation scheme as discussed in further detail later herein. PN generators 120 and 122 thus respectively provide the output sequences, $PN_I$ and $PN_Q$. The $PN_I$ and $PN_Q$ sequences are respectively referred to as the In-Phase (I) and Quadrature (Q) channel PN sequences.

The two PN sequences, $PN_I$ and $PN_Q$ are generated by different polynomials of degree 15, augmented to produce sequences of length 32,768 rather than 32,767 which would normally be produced. For example, the augmentation may appear in the form of the addition of a single zero to the run of fourteen 0's in a row which appears one time in every maximal-length linear sequence of degree 15. In other words, one state of the PN generator would be repeated in the generation of the sequence. Thus, the modified sequence contains one run of fifteen 1's and one run of fifteen 0's.

In the exemplary embodiment receiver 36 also includes a long code PN generator 124 which generates a $PN_u$ sequence corresponding to a PN sequence generated by the mobile unit in the mobile-to-cell link. PN generator 124 can be a maximal-length linear sequence generator that generates a user PN code that is very long, for example degree 42, time shifted in accordance with an additional factor such as the mobile unit address or user ID to provide discrimination among users. Thus the cell-site received signal is modulated by both the long code $PN_u$ sequence and the short code $PN_I$ and $PN_Q$ sequences. In the alternative, a non-linear encryption generator, such as an encryptor using the data encryption standard (DES) to encrypt a 64-symbol representation of universal time using a user specific key, may be utilized in place of PN generator 124.

The $PN_u$ sequence output from PN generator 124 is exclusive-OR'ed with the $PN_I$ and $PN_Q$ sequences respectively in exclusive-OR gates 126 and 128 to provide the sequences $PN_{I'}$ and $PN_{Q'}$.

The sequences $PN_{I'}$ and $PN_{Q'}$ are provided to PN QPSK correlator 130 along with the I and Q channel signals output from receiver 32. Correlator 130 is utilized to correlate the I and Q channel data with the $PN_{I'}$ and $PN_{Q'}$ sequences. The correlated I and Q channel outputs of correlator 130 are respectively provided to accumulators 132 and 134 where the symbol data is accumulated over a 4-chip period. The outputs of accumulators 132 and 134 are provided as inputs to Fast Hadamard Transform (FHT) processor 136. FHT processor 148 produces a set of 64 coefficients for every 6 symbols. The 64coefficients are then multiplied by a weighing function generated in control processor 48. The weighing function is linked to the demodulated signal strength. The weighted data output from FHT 136 is provided to diversity combiner and decoder circuitry 50 (FIG. 14) for further processing.

The second receiver system processes the received signals in a manner similar to that discussed with respect to the first receiver system of FIGS. 14 and 15. The weighted 64 symbols output from receivers 36 and 46 are provided to diversity combiner and decoder circuitry 40. Circuitry 50 includes an adder which adds the weighted 64 coefficients from receiver 36 to the weighted 64 coefficients from receiver 46. The resulting 64 coefficients are compared with one another in order to determine the largest coefficient. The magnitude of the comparison result, together with the identity or the largest of the 64 coefficients, is used to determine a set of decoder weights and symbols for use within a Viterbi algorithm decoder implemented in circuitry 50.

The Viterbi decoder contained within circuitry 50 is of a type capable of decoding data encoded at the mobile unit with a constraint length K=9, and of a code rate r=1/2. The Viterbi decoder is utilized to determine the most likely information bit sequence. Periodically, nominally 1.25 msec, a signal quality estimate is obtained and transmitted as a mobile unit power adjustment command along with data to the mobile unit. Further information on the generation of this quality estimate is discussed in further detail in U.S. Pat. No. 5,056,109 entitled "Method and Apparatus for Controlling Transmission Power In A CDMA Cellular Mobile Telephone System." This quality estimate is the average signal-to-noise ratio over the 1.25 msec interval.

Each data receiver tracks the timing of the received signal it is receiving. This is accomplished by the well known technique of correlating the received signal by a slightly early local reference PN and correlating the received signal with a slightly late local reference PN. The difference between these two correlations will average to zero if there is no timing error. Conversely, if there is a timing error, then this difference will indicate the magnitude and sign of the error and the receiver's timing is adjusted accordingly.

The cell-site further includes antenna 62 which is coupled to GPS receiver 64. GPS receiver processes signals received on antenna 62 from satellites in the Navistar Global Positioning System satellite navigation system so as to provide timing signals indicative of Universal Coordinated Time (UTC). GPS receiver 64 provides these timing signals to control processor 48 for timing synchronizing at the cell-site as discussed previously.

In FIG. 14 optional digital data receiver 38 may be included for improved performance of the system. The structure and operation of this receiver is similar to that described with reference to the data receivers 36 and 46. Receiver 38 may be utilized at the cell-site to obtain additional diversity modes. This additional data receiver alone or in combination with additional receivers can track and receive other possible delay paths of mobile unit transmitted signals. Optional additional digital data receivers such as receiver 38 provides additional diversity modes which are extremely useful in those cell-sites which are located in dense urban areas where many possibilities for multipath signals occur.

Signals from the MTSO are coupled to the appropriate transmit modulator via digital link 52 under control of control processor 48. Transmit modulator 54 under control of control processor 48 spread spectrum modulates the data for transmission to the intended recipient mobile unit.

The output of transmit modulator 54 is provided to transmit power control circuitry 56 where under the control of control processor 48 the transmission power may be controlled. The output of circuitry 56 is provided to summer 57 where it is summed with the output of transmit modulator/transmit power control circuits directed to other mobiles in the cell. The output of summer 57 is provided to transmit power amplifier circuitry 58 where output to antenna 60 for radiating to mobile units within the cell service area. FIG. 14 further illustrates pilot/control channel generators and transmit power control circuitry 66. Circuitry 66 under control of control processor generates and power controls the pilot signal, the sync channel, and the paging channel for coupling to circuitry 58 and output to antenna 60.

Figure 16:
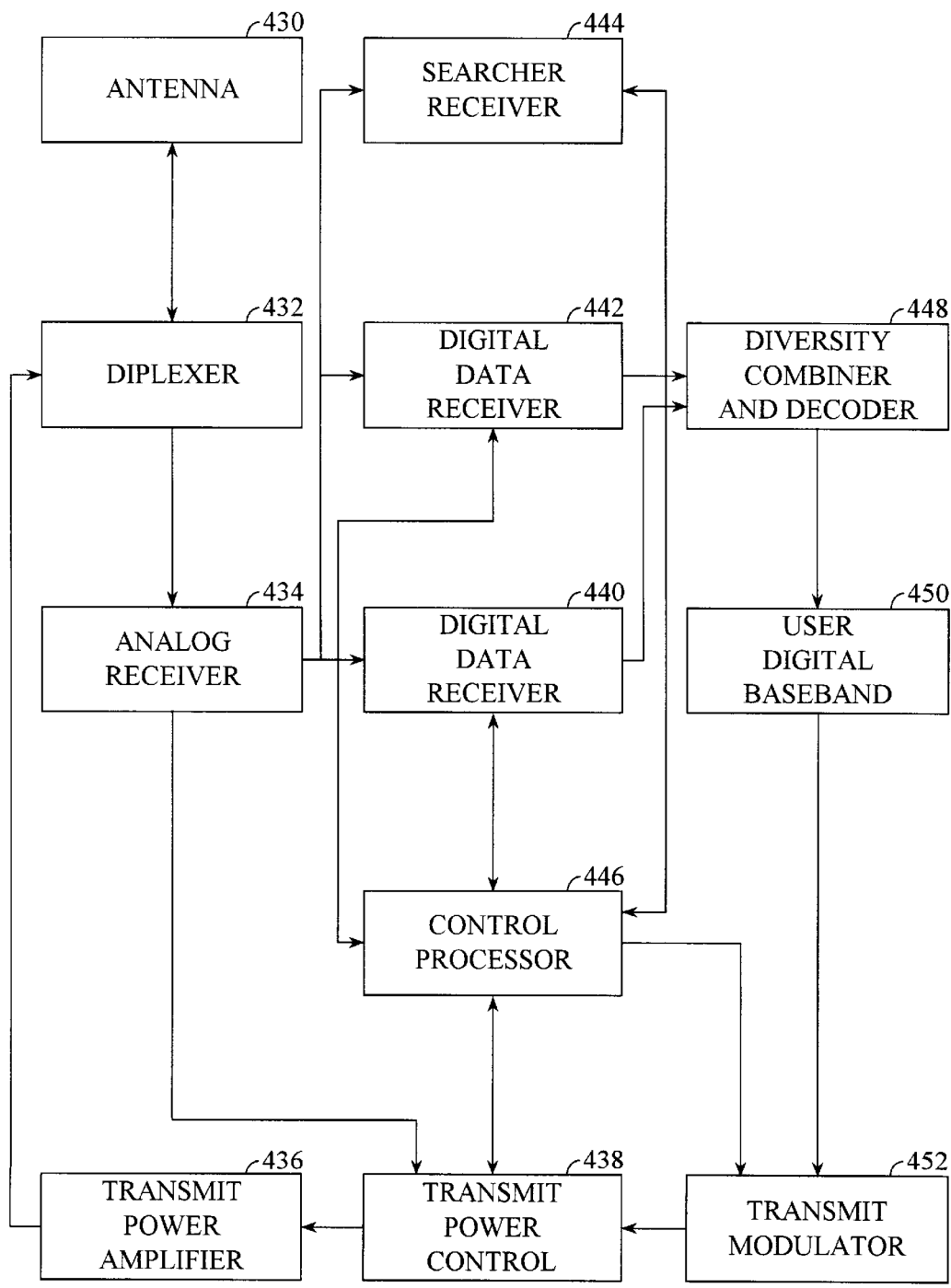
FIG. 16 is a block diagram of the mobile unit telephone configured for CDMA communications in the CDMA cellular telephone system.

FIG. 16 illustrates in block diagram form an exemplary mobile unit CDMA telephone set. The mobile unit CDMA telephone set includes an antenna 430 which is coupled through diplexer 432 to analog receiver 434 and transmit power amplifier 436. Antenna 430 and diplexer 432 are of standard design and permit simultaneous transmission and reception through a single antenna. Antenna 430 collects transmitted signals and provides them through diplexer 432 to analog receiver 434. Receiver 434 receives the RF frequency signals from diplexer 432 which are typically in the 850 MHz frequency band for amplication and frequency downconversion to an IF frequency. This translation process is accomplished using a frequency synthesizer of standard design which permits the receiver to be tuned to any of the frequencies within the receive frequency band of the overall cellular telephone frequency band. The signals are also filtered and digitized for providing to digital data receivers 440 and 442 along with searcher receiver 444.

Figure 17:
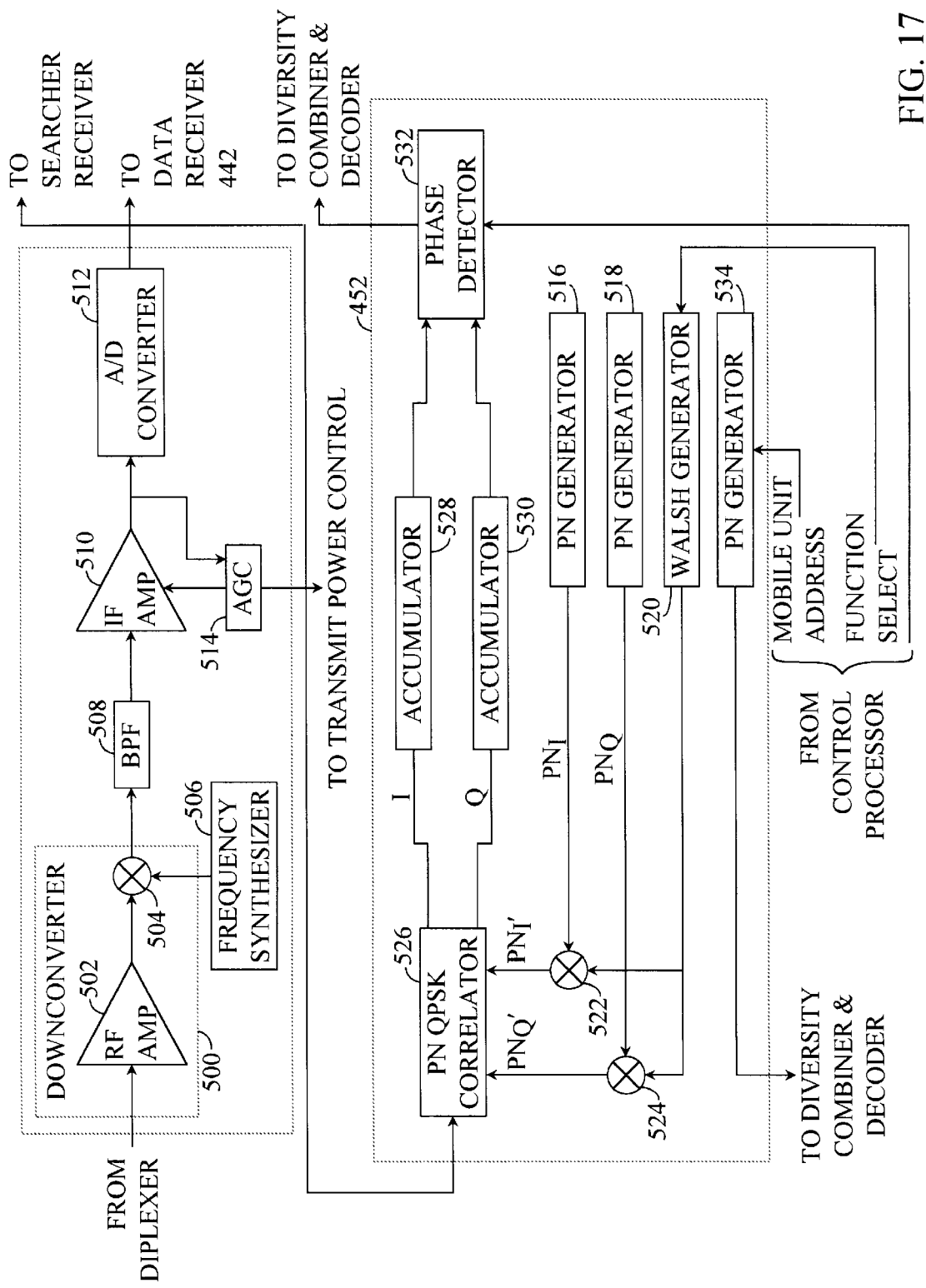
FIG. 17 is a block diagram of the mobile unit receiver.

The details of receiver 434 are further illustrated in FIG. 17. Received signals from antenna 430 are provided to downcoverter 500 which is comprised of RF amplifier 502 and mixer 504. The received signals are provided as an input to RF amplifier 502 where they are amplified and output as an input to mixer 504. Mixer 504 is provided with another input, that being the signal output from frequency synthesizer 506. The amplified RF signals are translated in mixer 504 to an IF frequency by mixing with the frequency synthesizer output signal.

The IF signals are output from mixer 504 to bandpass filter (BPF) 508, typically a Surface Acoustic Wave (SAW) filter having a passband of approximately 1.25 MHz, where they are from bandpass filtered. The characteristics of the SAW filter are chosen to match the waveform of the signal transmitted by the cell-site. The cell-site transmitted signal is a direct sequence spread spectrum signal that is modulated by a PN sequence clocked at a predetermined rate, which in the exemplary embodiment is 1.2288 MHz. This clock rate is chosen to be an integer multiple of the baseband data rate of 9.6 kbps.

The filtered signals are output from BPF 508 as an input to a variable gain IF amplifier 510 where the signals are again amplified. The amplified IF signals are output from IF amplifier 510 to analog to digital (A/D) converter 512 where the signals are digitized. The conversion of the IF signal to a digital signal occurs at a 9.8304 MHz clock rate in the exemplary embodiment which is exactly eight times the PN chip rate. Although (A/D) converter 512 is illustrated as part of receiver 534, it could instead be a part of the data and searcher receivers. The digitized IF signals are output from (A/D) converter 512 to data receivers 440 and 442, and searcher receiver 444.

Receiver 434 also performs a power control function for adjusting the transmit power of the mobile unit. An automatic gain control (AGC) circuit 514 is also coupled to the output of IF amplifier 510. In response to the level of the amplified IF signal, AGC circuit 514 provides a feedback signal to the gain control input of IF amplifier 510. Receiver 434 also uses AGC circuit 514 to generate an analog power control signal that is provided to transmit power control circuitry 438.

In FIG. 16, the digitized signal output from receiver 434 is provided to digital data receivers 440 and 442 and to searcher receiver 444. It should be understood that an inexpensive, low performance mobile unit might have only a single data receiver while higher performance units may have two or more to allow diversity reception.

The digitized IF signal may contain the signals of many on-going calls together with the pilot carriers transmitted by the current cell-site and all neighboring cell-sites. The function of the receivers 440 and 442 are to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in the present invention is that discrimination is provided against multipath signals. When the signal arrives at the mobile receiver after passing through more than one path, there will be a difference in the reception time of the signal. This reception time difference corresponds to the difference in distance divided by the velocity of propagation. If this time difference exceeds one microsecond, then the correlation process will discriminate between one of the paths. The receiver can choose whether to track and receive the earlier or later path. If two receivers are provided, such as receivers 440 and 442, then two independent paths can be tracked and processed in parallel.

Searcher receiver 444, under control of control processor 446 is for continuously scanning the time domain around the nominal time of a received pilot signal of the cell-site for other multipath pilot signals from the same cell-site and for other cell-site transmitted pilot signals. Receiver 444 will measure the strength of any reception of a desired waveform at times other than the nominal time. Receiver 444 compares signal strength in the received signals. Receiver 444 provides a signal strength signal to control processor 446 indicative of the strongest signals.

Processor 446 provides control signals to data receivers 440 and 442 for each to process a different one of the strongest signals. On occasion another cell-site transmitted pilot signal is of greater signal strength than the current cell-site signal strength. Control processor 446 then would generate a control message for transmission to the system controller via the current cell-site requesting a transfer of the cell to the cell-site corresponding to the strongest pilot signal. Receivers 440 and 442 may therefor handle calls through two different cell-sites.

During a soft handoff operation, the mobile unit will be receiving signals from two or more cells. Because the mobile unit can only align its timing in response to one of cells' timing adjust commands, the mobile unit will normally move its timing in response to the commands received from the strongest cell being received. The mobile unit transmitted signal will thus be in time alignment with the cell with which it has the best path. Otherwise greater mutual interference to other users will result.

Further details of an exemplary receiver, such as data receiver 440 is illustrated in further detail in FIG. 17. Data receiver 440 includes PN generators 516 and 518 which generate the $PN_I$ and $PN_Q$ sequences in a manner and corresponding to those generated by the cell-site. Timing and sequence control signals are provided to PN generators 516 and 518 from control processor 446. Data receiver 440 also includes Walsh generator 520 which provides the appropriate Walsh function for communication with this mobile unit by the cell-site. Walsh generator 520 generates, in response to timing signals (not shown) and a function select signal from the control processor, a signal corresponding to an assigned Walsh sequence. The function select signal transmitted to the mobile unit by the cell-site as part of the call set up message. The $PN_I$ and $PN_Q$ sequences output from PN generators 516 and 518 are respectively input to exclusive-OR gates 522 and 524. Walsh generator 520 provides its output to both of exclusive-OR gates 522 and 524 where the signals are exclusive-OR'ed and output the sequences $PN_{I'}$ and $PN_{Q'}$.

The sequences $PN_{I'}$ and $PN_{Q'}$ are provided to receiver 440 where they are input to PN QPSK correlator 526. PN correlator 526 may be constructed in a manner similar to the PN correlator of the cell-site digital receivers. PN correlator 526 correlates the received I and Q channel data with the $PN_{I'}$ and $PN_{Q'}$ sequences and provides correlated I and Q channel data output to corresponding accumulators 528 and 530. Accumulators 528 and 530 accumulate the input information over a period of one symbol or 64 chips. The accumulator outputs are provided to phase rotator 532 which also receives a pilot phase signal from control processor 446. The phase of the received symbol data is rotated in accordance with the phase of the pilot signal as determined by the searcher receiver and the control processor. The output from phase rotator 532 is the I channel data which is provided to the deinterleaver and decoder circuitry.

Control processor 446 also includes PN generator 534 which generates the user PN sequence in response to an input mobile unit address or user ID. The PN sequence output from PN generator 534 is provided to diversity combiner and decoder circuitry. Since the cell-to-mobile signal is scrambled with the mobile user address PN sequence, the output from PN generator 534 is used in descrambling the cell-site transmitted signal intended for this mobile user similar to that as in the cell-site receiver. PN generator 534 specifically provides the output PN sequence to the deinterleaver and decoder circuitry where it is used to descramble the scrambled user data. Although scrambling is discussed with reference to a PN sequence, it is envisioned that other scrambling techniques including those well known in the art may be utilized.

The outputs of receivers 440 and 442 are thus provided to diversity combiner and decoder circuitry 448. The diversity combiner circuitry contained within circuitry 448 simply adjusts the timing of the two streams of received symbols into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward error detection (FEC) decoder also contained within circuitry 448. The usual digital baseband equipment is a digital vocoder system. The CDMA system is designed to accommodate a variety of different vocoder designs.

Baseband circuitry 450 typically includes a digital vocoder (not shown) which may be a variable rate type as disclosed in patent application Ser. No. 07/713,661, filed Jun. 11, 1991. Baseband circuitry 450 further serves as an interface with a handset or any other type of peripheral device. Baseband circuitry 450 accommodates a variety of different vocoder designs. Baseband circuitry 450 provides output information signals to the user in accordance with the information provided thereto from circuitry 448.

In the mobile-to-cell link, user analog voice signals are typically provided through a handset as an input to baseband circuitry 450. Baseband circuitry 450 includes an analog to digital (A/D) converter (not shown) which converts the analog signal to digital form. The digital signal is provided to the digital vocoder where it is encoded. The vocoder output is provided to a forward error correction (FEC) encoding circuit (not shown) for error correction. In the exemplary embodiment the error correction encoding implemented is of a convolutional encoding scheme. The digitized encoded signal is output from baseband circuitry 450 to transmit modulator 452.

Transmit modulator 452 first Walsh encodes the transmit data and then modulates the encoded signal on a PN carrier signal whose PN sequence is chosen according to the assigned address function for the call. The PN sequence is determined by control processor 446 from call setup information that is transmitted by the cell-site and decoded by receivers 440 and 442 and control processor 446. In the alternative, control processor 446 may determine the PN sequence through prearrangement with the cell-site. Control processor 446 provides the PN sequence information to transmit modulator 452 and to receivers 440 and 442 for call decoding.

The output of transmit modulator 452 is provided to transmit power control circuitry 438. Signal transmission power is controlled by the analog power control signal provided from receiver 434. Control bits transmitted by the cell-sites in the form power adjustment command are processed by data receivers 440 and 442. The power adjustment command is used by control processor 446 in setting the power level in mobile unit transmission. In response to this command, control processor 446 generates a digital power control signal that is provided to circuitry 438. Further information on the relationship of receivers 440 and 442, control processor 446 and transmit power control 438 with respect to power control is further described in the above-mentioned patent.

Transmit power control circuitry 438 outputs the power controlled modulated signal to transmit power amplifier circuitry 436. Circuitry 436 amplifies and converts the IF signal to an RF frequency by mixing with a frequency synthesizer output signal which tunes the signal to the proper output frequency. Circuitry 436 includes an amplifier which amplifies the power to a final output level. The intended transmission signal is output from circuitry 436 to diplexer 432. Diplexer 432 couples the signal to antenna 430 for transmission to the cell-sites.

Control processor 446 also is capable of generating control messages such as cell-diversity mode requests and cell-site communication termination commands. These commands are provided to transmit modulator 452 for transmission. Control processor 446 is responsive to the data received from data receivers 440, 442 and search receiver 444 for making decisions relative to handoff and diversity combining.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method for determining the position of a mobile station within a cellular telephone system having first and second base stations, comprising the steps of:

(A) measuring, at said first base station, a round trip signal propagation time between said first base station and said mobile station;

(B) transmitting a first signal from said first base station to said mobile station, and transmitting a second signal from said second base station to said mobile station;

(C) measuring, at said mobile station, an arrival time difference representing a time interval between a first relative time when said first signal is received at said mobile station and a second relative time when said second signal is received at said mobile station; and (D) determining said position of said mobile station in accordance with said round trip propagation time and said arrival time difference.

2. The method of claim 1, wherein said first base station includes a sector antenna, and step (D) further comprises determining, with said sector antenna, a sector in which said mobile station is positioned, and said position of said mobile station is determined in step (D) in accordance with said round trip propagation time, said arrival time difference and said sector.

3. The method of claim 2, wherein said round trip propagation time is used in step (D) to calculate a circle on which said mobile station is positioned, said arrival time difference is used to identify first and second candidate positions of said mobile station along said circle, and said sector is used for selecting said position of said mobile station from said first and second candidate positions.

4. The method of claim 1, further comprising the step of using a map matching table to estimate said position of said mobile station from said round trip propagation time and said arrival time difference.

5. The method of claim 1, wherein step (D) is performed within a switching center of said cellular system.

6. The method of claim 1, wherein step (D) is performed with said first base station.

7. A method for determining the position of a mobile station within a cellular telephone system having first and second base stations, comprising the steps of:

(A) measuring, at said first base station, a first round trip signal propagation time between said first base station and said mobile station;

(B) measuring, at said second base station, a second round trip signal propagation time between said second base station and said mobile station; and (C) determining said position of said mobile station in accordance with said first and second round trip propagation times.

8. The method of claim 7, wherein said first base station includes a sector antenna, and step (C) further comprises determining, with said sector antenna, a sector in which said mobile station is positioned, and said position of said mobile station is determined in accordance with said first and second round trip propagation times and said sector.

9. The method of claim 8, wherein said first round trip propagation time is used in step (C) to calculate a first circle on which said mobile station is positioned, said second round trip propagation time is used to calculate a second circle on which said mobile station is positioned, said first and second circles intersecting at first and second candidate positions of said mobile station, wherein said sector is used for selecting said position of said mobile station from said first and second candidate positions.

10. The method of claim 7, further comprising the step of using a map matching table to estimate said position of said mobile station from said first and second said round trip propagation times.

11. The method of claim 7, wherein step (C) is performed within a switching center in said cellular system.

12. The method of claim 7, wherein step (C) is performed with said first base station.

13. The method of claim 7, further comprising the step of, prior to steps (A) and (B), temporarily transmitting a signal at an increased power from said mobile station, and measuring said first and second round trip signal propagation times in steps (A) and (B) using said signal transmitted at said increased power level.

14. The method of claim 13, further comprising the step of, after steps (A) and (B), transmitting said signal at a lower power level that is less than said increased power from said mobile station.

* * * * *